US 8,189,679 B2

(12) United States Patent
Tsukagoshi et al.

(10) Patent No.: US 8,189,679 B2
(45) Date of Patent: May 29, 2012

(54) CONTENT RECEIVING APPARATUS, METHOD OF CONTROLLING VIDEO-AUDIO OUTPUT TIMING AND CONTENT PROVIDING SYSTEM

(75) Inventors: Ikuo Tsukagoshi, Tokyo (JP); Shinji Takada, Kanagawa (JP); Koichi Goto, Kanagawa (JP)

(73) Assignee: Sony Corporation, Tokyo (JP)

( * ) Notice: Subject to any disclaimer, the term of this patent is extended or adjusted under 35 U.S.C. 154(b) by 926 days.

(21) Appl. No.: 11/661,347

(22) PCT Filed: Aug. 31, 2005

(86) PCT No.: PCT/JP2005/016358
§ 371 (c)(1),
(2), (4) Date: Aug. 14, 2008

(87) PCT Pub. No.: WO2006/025584
PCT Pub. Date: Mar. 9, 2006

(65) Prior Publication Data
US 2008/0304571 A1    Dec. 11, 2008

(30) Foreign Application Priority Data
Sep. 2, 2004    (JP) ................. 2004-256203

(51) Int. Cl.
*H04N 11/02*    (2006.01)
(52) U.S. Cl. ......... 375/240.25; 375/240.24; 375/240.26; 375/240.27; 375/240.28; 348/39; 348/423.1; 348/441; 370/458; 370/468; 370/537
(58) Field of Classification Search .......... 370/458, 370/468, 537; 348/39, 423.1, 441; 375/240, 375/240.24, 240.25, 240.26, 240.27, 240.28
See application file for complete search history.

(56) References Cited

U.S. PATENT DOCUMENTS
6,356,871 B1 * 3/2002 Hemkumar et al. .......... 704/500
(Continued)

FOREIGN PATENT DOCUMENTS
EP    1 289 306 A2    8/2002
(Continued)

OTHER PUBLICATIONS
Yasuda, "Multimedia Fugoka no Kokusai Hyojun", pp. 226-227, (Jun. 30, 1991).
(Continued)

*Primary Examiner* — Ayaz R. Sheikh
*Assistant Examiner* — Andrew C Lee
(74) *Attorney, Agent, or Firm* — Finnegan, Henderson, Farabow, Garrett & Dunner, L.L.P.

(57) ABSTRACT

The present invention can reliably adjust the lip-sync between an video and audio at a decoder side, without making the viewer feel strangeness.
In this invention, the encoded video frames to which video time-stamps VTS are attached and the encoded audio frames to which audio time-stamps ATS are attached, all received, are decoded, generating a plurality of video frames VF1 and a plurality of audio frames AF1. The video frames VF1 and audio frames AF1 are accumulated. Renderers 37 and 77 calculate the time difference resulting from a gap between the reference clock for the encoder side and the system time clock stc for the decoder side. In accordance with the time difference, the timing of outputting the plurality of video frames, one by one, on the basis of a timing of outputting the plurality of audio frames, one by one. Hence, the lip-sync can be achieved, while maintaining the continuity of the audio.

8 Claims, 14 Drawing Sheets

U.S. PATENT DOCUMENTS

| | | | |
|---|---|---|---|
| 6,429,902 B1 * | 8/2002 | Har-Chen et al. | 348/518 |
| 6,477,204 B1 * | 11/2002 | Fukushima et al. | 375/240.28 |
| 6,480,537 B1 | 11/2002 | Agrawal et al. | |
| 6,493,832 B1 | 12/2002 | Itakura et al. | |
| 6,516,005 B1 * | 2/2003 | Murayama et al. | 370/503 |
| 6,570,926 B1 * | 5/2003 | Agrawal et al. | 375/240.27 |
| 6,584,125 B1 * | 6/2003 | Katto | 370/537 |
| 6,724,825 B1 * | 4/2004 | Nemiroff et al. | 375/240.27 |
| 6,792,047 B1 * | 9/2004 | Bixby et al. | 375/240.26 |
| 6,806,909 B1 * | 10/2004 | Radha et al. | 348/384.1 |
| 6,862,045 B2 * | 3/2005 | Morimoto et al. | 348/515 |
| RE39,345 E * | 10/2006 | Katto | 375/240.28 |
| 7,315,622 B2 * | 1/2008 | Mani et al. | 380/210 |
| 7,693,222 B2 * | 4/2010 | Balakrishnan et al. | 375/240.28 |
| 7,924,929 B2 * | 4/2011 | Meenakshisundaram et al. | 375/240.28 |
| 7,983,345 B2 | 7/2011 | Tsukagoshi et al. | |
| 2002/0064189 A1 * | 5/2002 | Coupe et al. | 370/537 |
| 2002/0141451 A1 | 10/2002 | Gates et al. | |
| 2003/0043924 A1 * | 3/2003 | Haddad et al. | 375/240.28 |
| 2003/0066094 A1 | 4/2003 | van der Schaar et al. | |
| 2003/0179879 A1 | 9/2003 | Kranz | |
| 2004/0190459 A1 | 9/2004 | Ueda et al. | |
| 2004/0264577 A1 * | 12/2004 | Jung | 375/240.24 |
| 2005/0025249 A1 * | 2/2005 | Zhao et al. | 375/240.24 |
| 2006/0072399 A1 * | 4/2006 | Fujimoto et al. | 369/47.1 |

FOREIGN PATENT DOCUMENTS

| | | |
|---|---|---|
| EP | 1 289 306 A2 | 3/2003 |
| GB | 2 338 383 A | 12/1999 |
| JP | 8-251543 | 9/1996 |
| JP | 08-280008 A | 10/1996 |
| JP | 11-88856 | 3/1999 |
| JP | 2000-134581 A | 5/2000 |
| JP | 2000-152189 A | 5/2000 |
| JP | 2003-169296 | 6/2003 |
| JP | 2003-179879 | 6/2003 |
| JP | 2004-015553 | 1/2004 |
| JP | 2004-180127 | 6/2004 |
| WO | WO 2005/025224 A1 | 7/2004 |

OTHER PUBLICATIONS

Supplementary European Search Report mailed Sep. 14, 2009, in corresponding European {Patent Application No. 05 77 8546.

Chang et al., Design and implementation of a real-time MPEG II bit rate measure system. IEEE Transactions on Consumer Electronics, 45(1), Feb. 1, 1999, 165-170 (XP000888368).

Office Action mailed on Aug. 31, 2010, in U.S. Appl. No. 10/570,069, pp. 1-7.

Notice of Allowance mailed on Mar. 17, 2011, in U.S, Appl. No. 10/570,069, pp. 1-10.

Supplementary European Search Report dated Aug. 25, 2010, in E P04771005, pp. 1-2.

English translation of the International Preliminary Report on Patentability issued on Mar. 20, 2007, in PCT/JP2004/010744, pp. 1-7.

* cited by examiner

CONTENT RECEIVING APPARATUS, METHOD OF CONTROLLING VIDEO-AUDIO OUTPUT TIMING AND CONTENT PROVIDING SYSTEM

TECHNICAL FIELD

The present invention relates to a content receiving apparatus, a method of controlling video-audio output timing and a content providing system, which are fit for use in eliminating the shifting of the lip-sync between an video and audio in, for example, a decoder that receives contents.

BACKGROUND ART

Hitherto, in a content receiving apparatus, a content received from the server provided at an encoder side is divided into video packets and audio packets and is thereby decoded. The apparatus outputs video frames based on the video time-stamps added to the video packets and on the audio time-stamps added to the audio packets. This makes the video and the audio agree in output timing (thus accomplishing lip-sync) (See, for example, Patent Document 1 and Patent Document 2).

Patent Document 1: Jpn. Pat. Appln. Laid-Open Publication No. 8-280008.

Patent Document 2: Jpn. Pat. Appln. Laid-Open Publication No. 2004-15553.

PROBLEM TO BE SOLVED BY THE INVENTION

In the content receiving apparatus configured as described above, the system time clock for the decoder side and the reference clock for the encoder side are not always synchronous to each other. Further, the system time clock for the decoder side may minutely differ in frequency from the reference clock for the encoder side, because of the clock jitter in the system time clock for the decoder side.

In the content receiving apparatus, data lengths of the video frames, and the audio frames are different. Hence, if the system time clock for the decoder side is not completely synchronous with the reference clock for the encoder side, the output timing of the video data will differ from the output timing of the audio data even if the video frames and audio frames are output on the basis of the video time-stamp and audio time-stamp. The lip-sync will inevitably shift.

DISCLOSURE OF INVENTION

The present invention has been made in view of the foregoing. An object of the invention is to provide a content receiving apparatus, a method of controlling the video-audio output timing and a content providing system, which can reliably adjust the lip-sync between an video and audio at the decoder side, without making the user, i.e., viewer, feel uncomfortable.

To achieve the object, a content receiving apparatus according to this invention comprises: a decoding means for receiving, from a content providing apparatus provided at an encoder side, a plurality of encoded video frames to which video time-stamps based on reference clock for the encoder side are attached and a plurality of encoded audio frames to which audio time-stamps based on a reference clock for the encoder side are attached, and for decoding the encoded video frames and the encoded audio frames; a storing means for storing a plurality of video frames that the decoding means has obtained by decoding the encoded video frames and a plurality of audio frames that the decoding means has obtained by decoding the encoded audio frames; a calculating means for calculating a time difference resulting from a gap between a clock frequency of a reference clock for the encoder side and a clock frequency of a system time clock for the decoder side; and a timing-adjusting means for adjusting a timing of outputting the plurality of video frames, one by one, in accordance with the time difference and on the basis of a timing of outputting the plurality of audio frames, one by one.

The timing of outputting video frames sequentially is adjusted with respect to the timing of outputting audio frames sequentially, in accordance with the time difference resulting from the frequency difference between the reference clock at the encoder side and the system time clock at the decoder side. The difference in clock frequency between the encoder side and the decoder side is thereby absorbed. The timing of outputting video frames can therefore be adjusted to the timing of outputting audio frames. Lip-sync can be accomplished.

A method of controlling a video-audio output timing, according to this invention, comprises: a decoding step of first receiving, from a content providing apparatus provided at an encoder side, a plurality of encoded video frames to which video time-stamps based on reference clock for the encoder side are attached and a plurality of encoded audio frames to which audio time-stamps based on a reference clock for the encoder side are attached, and then decoding the encoded video frames and the encoded audio frames in a decoding means; a storing step of storing, in a storing means, a plurality of video frames obtained by decoding the encoded video frames in the decoding means and a plurality of audio frames obtained by decoding the encoded audio frames in the decoding means; a difference calculating step of calculating, in a calculating means, a time difference resulting from a gap between a clock frequency of a reference clock for the encoder side and a clock frequency of a system time clock for the decoder side; and a timing-adjusting step of adjusting, in an adjusting means, a timing of outputting the plurality of video frames, one by one, in accordance with the time difference and on the basis of a timing of outputting the plurality of audio frames, one by one.

Hence, the timing of outputting video frames sequentially is adjusted with respect to the timing of outputting audio frames sequentially, in accordance with the time difference resulting from the frequency difference between the reference clock at the encoder side and the system time clock at the decoder side. The difference in clock frequency between the encoder side and the decoder side is thereby absorbed. The timing of outputting video frames can therefore be adjusted to the timing of outputting audio frames. Lip-sync can be accomplished.

A content providing system according to the present invention has a content providing apparatus and a content receiving apparatus. The content providing apparatus comprises: an encoding means for generating a plurality of encoded video frames to which video time-stamps based on reference clock for an encoder side are attached and a plurality of encoded audio frames to which audio time-stamps based on a reference clock are attached; and a transmitting means for sequentially transmitting the plurality of encoded video frames and the plurality of encoded audio frames to the content receiving side. The content receiving apparatus comprises: a decoding means for receiving the plurality of encoded video frames to which video time-stamps are attached from the content providing apparatus for an encoder side and the plurality of encoded audio frames to which audio time-stamps are attached and for decoding the encoded video frames and the encoded audio frames; a storing means for storing the plurality of video frames that the decoding means has obtained by decoding the encoded video frames and the plurality of audio frames that the decoding means has obtained by decoding the encoded audio frames; a calculating means for calculating a time difference resulting from a gap between a clock frequency of a reference clock for the encoder side and a clock frequency of a system time clock for the decoder side; and a timing-adjusting means for adjusting a timing of outputting the plurality of video frames, one by one, in accordance with the time difference and on the basis of a timing of outputting the plurality of audio frames, one by one.

Hence, the timing of outputting video frames sequentially is adjusted with respect to the timing of outputting audio frames sequentially, in accordance with the time difference resulting from the frequency difference between the reference clock at the encoder side and the system time clock at the decoder side. The difference in clock frequency between the encoder side and the decoder side is thereby absorbed. The timing of outputting video frames can therefore be adjusted to the timing of outputting audio frames. Lip-sync can be accomplished.

As described above, in the present invention, the timing of outputting video frames sequentially is adjusted with respect to the timing of outputting audio frames sequentially, in accordance with the time difference resulting from the frequency difference between the reference clock at the encoder side and the system time clock at the decoder side. The difference in clock frequency between the encoder side and the decoder side is thereby absorbed. The timing of outputting video frames can therefore be adjusted to the timing of outputting audio frames. Lip-sync can be accomplished. Thus, the present invention can provide a content receiving apparatus, a method of controlling the video-audio output timing and a content providing system, which can reliably adjust the lip-sync between an video and audio at the decoder side, without making the user, i.e., viewer, feel strangeness.

BEST MODE FOR CARRYING OUT THE INVENTION

An embodiment of the present invention will be described with reference to the accompanying drawings.

(1) Overall Configuration of Content Providing System

Figure 1:
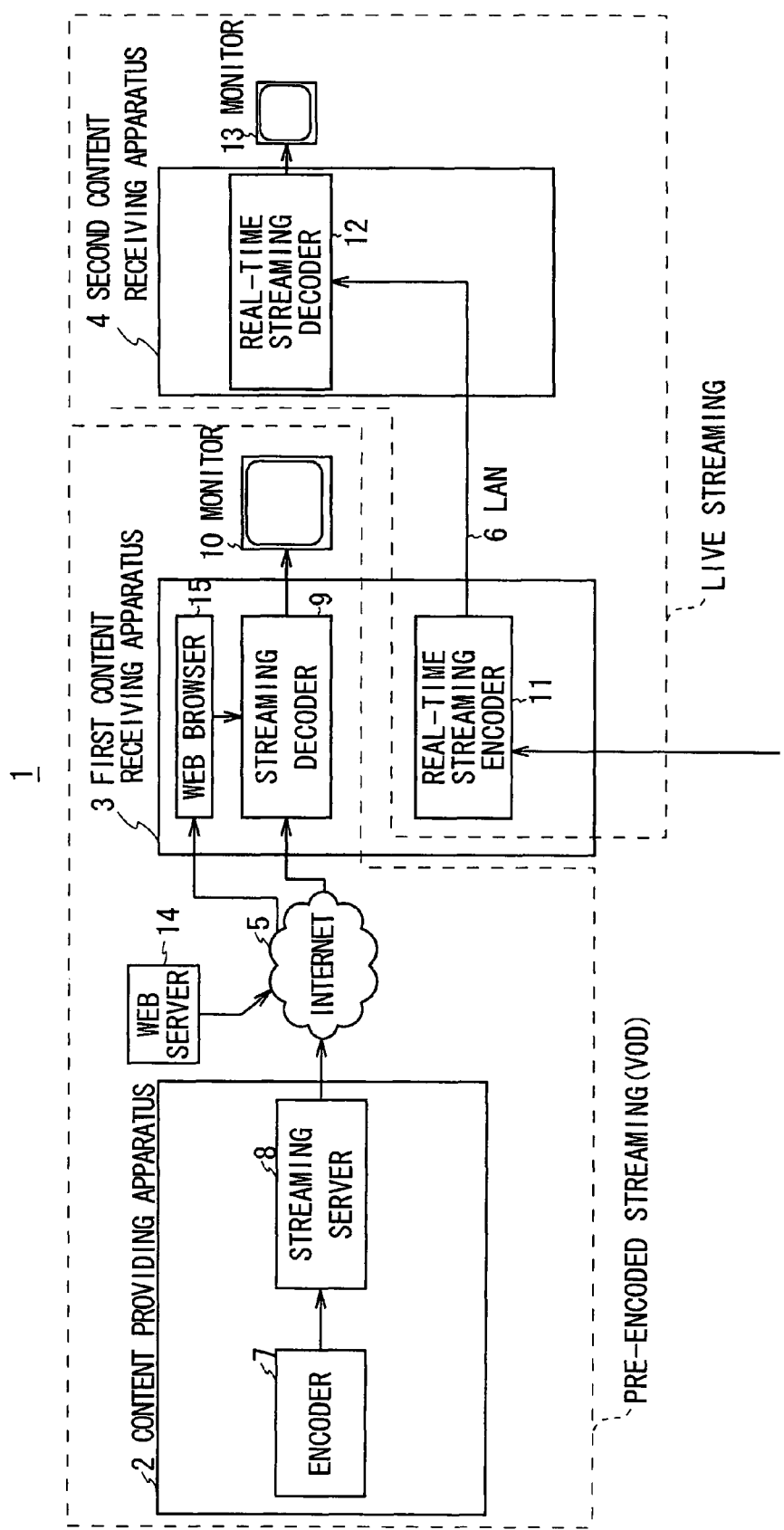
FIG. 1 is a schematic block diagram showing the overall configuration of a content providing system, illustrating a streaming system entirely.

In FIG. 1, reference number 1 designates a content providing system according to this invention. The system 1 comprises three major components, i.e., a content providing apparatus 2, a first content receiving apparatus 3, and a second content receiving apparatus 4. The content providing apparatus 2 is a content distributing side. The first content receiving apparatus 3 and the second content receiving apparatus 4 are content receiving sides.

In the content providing system 1, the content providing apparatus 2, Web server 14 and first content receiving apparatus 3 are connected to one another through the Internet 5. The URL (Uniform Resource Locator) and metadata concerning a content are acquired from the Web server 14 via the Internet 5 and are analyzed by the Web browser 15 provided in the first content receiving apparatus 3. The metadata and the URL are then supplied to a streaming decoder 9.

The streaming decoder 9 accesses the streaming server 8 of the content providing apparatus 2 on the basis of the URL analyzed by the Web browser 15. The streaming decoder 9 thus requests distribution of the content that a user wants.

In the content providing apparatus 2, the encoder 7 encodes the content data corresponding to the content the user wants, generating an elementary stream. The streaming server 8 converts the elementary stream into packets. The packets are then distributed to the first content receiving apparatus 3 through the Internet 5.

Thus, the content providing system 1 is configured to perform pre-encoded streaming, such as video-on-demand (VOD) wherein the content providing apparatus 2 distributes any content the user wants, in response to the request made by the first content receiving apparatus 3.

In the first content receiving apparatus 3, the streaming decoder 9 decodes the elementary stream, reproducing the original video and the original audio, and the monitor 10 outputs the original video and audio, In the content providing system 1, the first content receiving apparatus 3 and the second content receiving apparatus 4 are connected by a wireless LAN 6 that complies with specific standards such as IEEE (Institute of Electrical and Electronics Engineers) 802.11a/b/g. In the first content receiving apparatus 3, a real-time streaming encoder 11 encodes, in real time, contents transmitted from an external apparatus by terrestrial digital broadcasting, BS (Broadcast Satellite)/CS (Communication Satellite) digital broadcasting or terrestrial analog broadcasting, contents stored in DVDs (Digital Versatile Discs) or VideoCDs, or contents supplied from ordinary video cameras. The contents thus encoded are transmitted or relayed, by radio, to the second content receiving apparatus 4.

The first content receiving apparatus 3 and the second content receiving apparatus 4 need not be connected by a wireless LAN 6. Instead, they may be connected by a wired LAN.

In the second content receiving apparatus 4, the real-time streaming decoder 12 decodes the content received from the first content receiving apparatus 3, accomplishing streaming playback. The content thus played back is output to a monitor 13.

Thus, a live streaming is implemented between the first content receiving apparatus 3 and the second content receiving apparatus 4. That is, in the first content receiving apparatus 3, the real-time streaming encoder 11 encodes, in real time, the content externally supplied. The content encoded is transmitted to the second content receiving apparatus 4. The second content receiving apparatus 4 performs streaming playback on the contents, accomplishing live streaming.

(2) Configuration of Content Providing Apparatus

Figure 2:
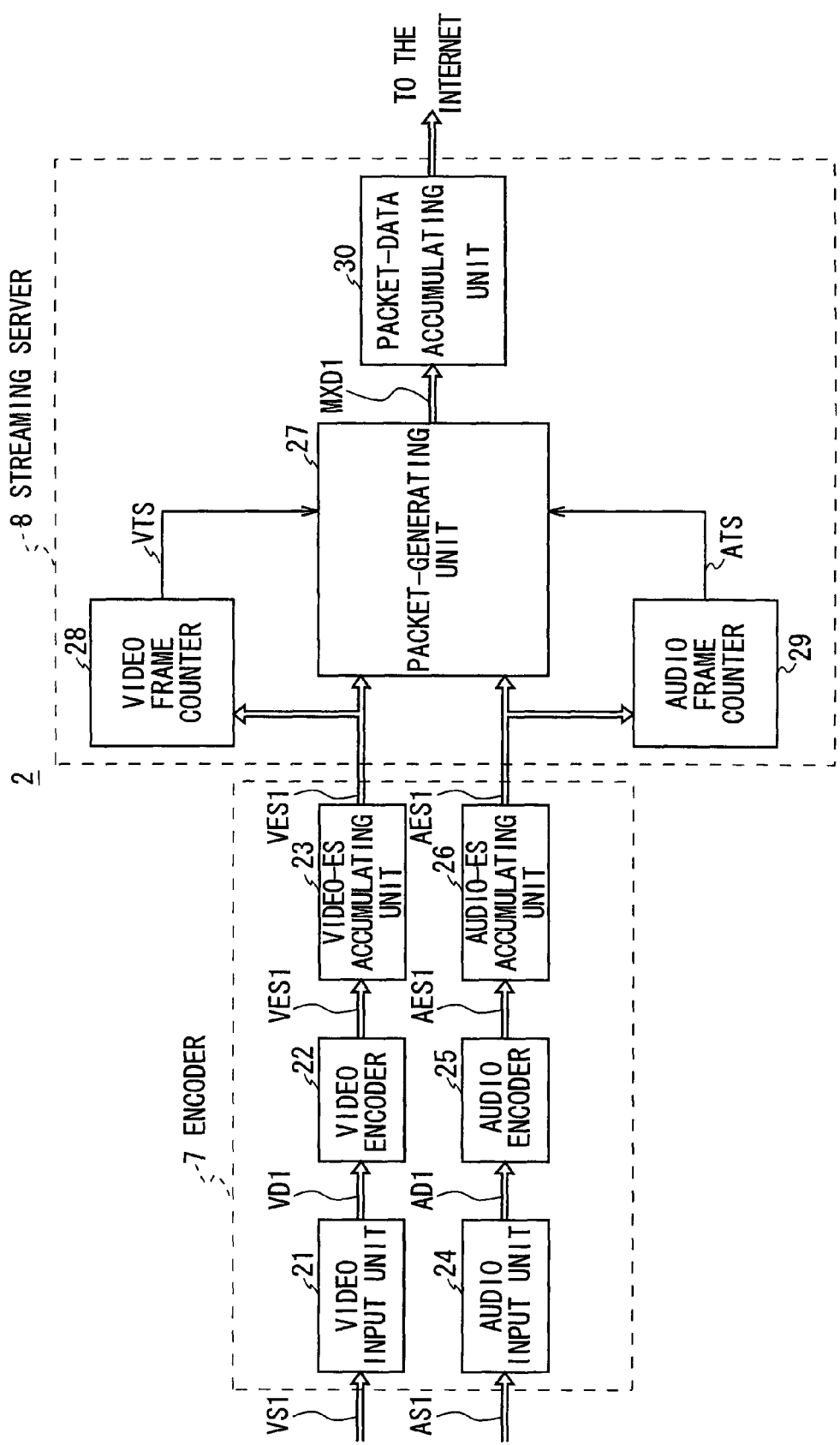
FIG. 2 is a schematic block diagram showing the circuit configuration of a content providing apparatus.

As shown in FIG. 2, the content providing apparatus 2 is constituted by the encoder 7 and the streaming server 8. In the encoder 7, a video input unit 21 receives a video signal VS1 externally supplied and converts the same into digital video data VD1. The digital video data VD1 is supplied to a video encoder 22.

The video encoder 22 compresses and encodes the video data VD1, performing a compression-encoding method complying with, for example, MPEG1/2/4 (Moving Picture Experts Group) or any other compression-encoding method. As a result, the video encoder 22 generates a video elementary stream VES1. The video elementary stream VES1 is supplied to a video-ES accumulating unit 23 that is constituted by a ring buffer.

The video-ES accumulating unit 23 temporarily stores the video elementary stream VES1 and sends the stream VES1 to the packet-generating unit 27 and video frame counter 28, which are provided in the streaming server 8.

The video frame counter 28 counts the frame-frequency units (29.97[Hz], 30[Hz], 59.94[Hz] or 60[Hz]) of the video elementary stream VES1. The counter 28 converts the resultant count-up value to a 90[KHz]—unit value based on the reference clock. This value is supplied to the packet-generating unit 27, as 32-bit video time-stamp VTS (VTS1, VTS2, VTS3, . . . ) for each video frame.

Meanwhile, in the content providing apparatus 2, an audio input unit 24 provided in the encoder 7 receives an audio signal AS1 externally acquired and converts the same into digital audio data AD1. The audio data AD1 is supplied to an audio encoder 25.

The audio encoder 25 compresses and encodes the audio data AD1, performing a compression-encoding method complying with, for example, MPEG1/2/4 standard or any other compression-encoding method. As a result, the audio encoder 25 generates an audio elementary stream AES1. The audio elementary stream AES1 is supplied to an audio-ES accumulating unit 26 that is constituted by a ring buffer.

The audio-ES accumulating unit 26 temporarily stores the audio elementary stream AES1 and sends the audio elementary stream AES1 to the packet-generating unit 27 and audio frame counter 29, which are provided in the streaming server 8.

As the video frame counter 28 does, the audio frame counter 29 converts the count-up value for the audio frames to a 90[KHz]—unit value based on the reference clock. This value is supplied to the packet-generating unit 27, as 32-bit audio time-stamp ATS (ATS1, ATS2, ATS3, . . . ) for each audio frame.

The packet-generating unit 27 divides the video elementary stream VES1 into packets of a preset size and adds video-header data to each packet thus obtained, thereby generating video packets. Further, the packet-generating unit 27 divides the audio elementary stream AES1 into packets of a preset size and adds audio-header data to each packet thus obtained, thereby providing audio packets.

Figure 3:
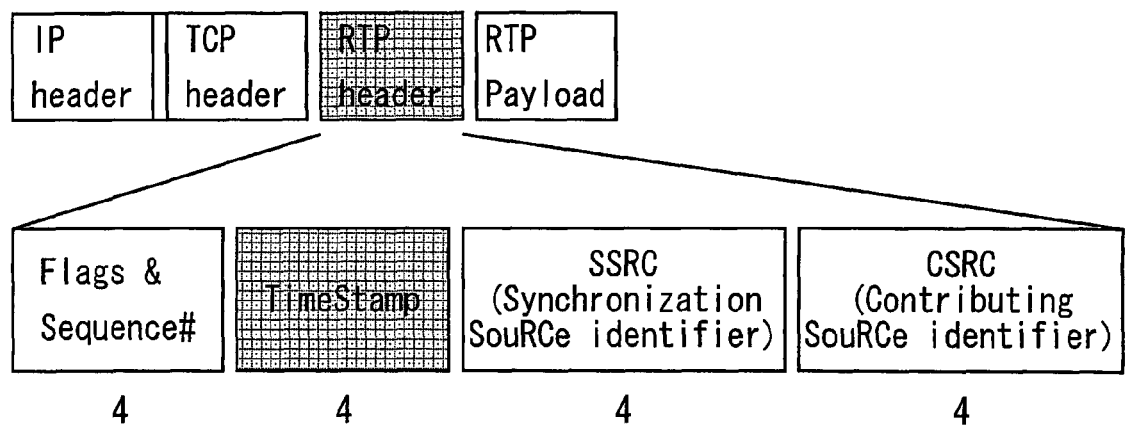
FIG. 3 is a schematic diagram representing the structure of a time stamp (TCP protocol) contained in an audio packet and a video packet.

As shown in FIG. 3, an audio packet and a video packet is composed of an IP (Internet Protocol) header, a TCP (Transmission Control Protocol) header, an RTP (RealTime Transport Protocol) header, and an RTP payload. The IP header controls the inter-host communication for the Internet layer. The TCP header controls the transmission for the transport layer. The RTP header controls the transport of real-time data. The RTP payload controls the transfer of real-time data. The RTP header has a 4-bytes time-stamp region, in which a video time-stamp ATS or a video time-stamp VTS can be written.

The packet-generating unit 27 (FIG. 2) generates video-packet data item composed of a preset number of bytes, from a video packet and a video time-stamp VTS. The packet-generating unit 27 also generates audio-packet data item composed of a preset number of bytes, from an audio packet and an audio time-stamp ATS. Further, the unit 27 multiplexes these data items, generating multiplex data MXD1. The multiplex data MXD1 is sent to a packet-data accumulating unit 30.

When the amount of the multiplex data MXD1 accumulated in the packet-data accumulating unit 30 reaches a predetermined value, the multiplex data MXD1 is transmitted via the Internet 5 to the first content receiving apparatus 3, using RTP/TCP (RealTime Transport Protocol/Transmission Control Protocol).

Figure 4:
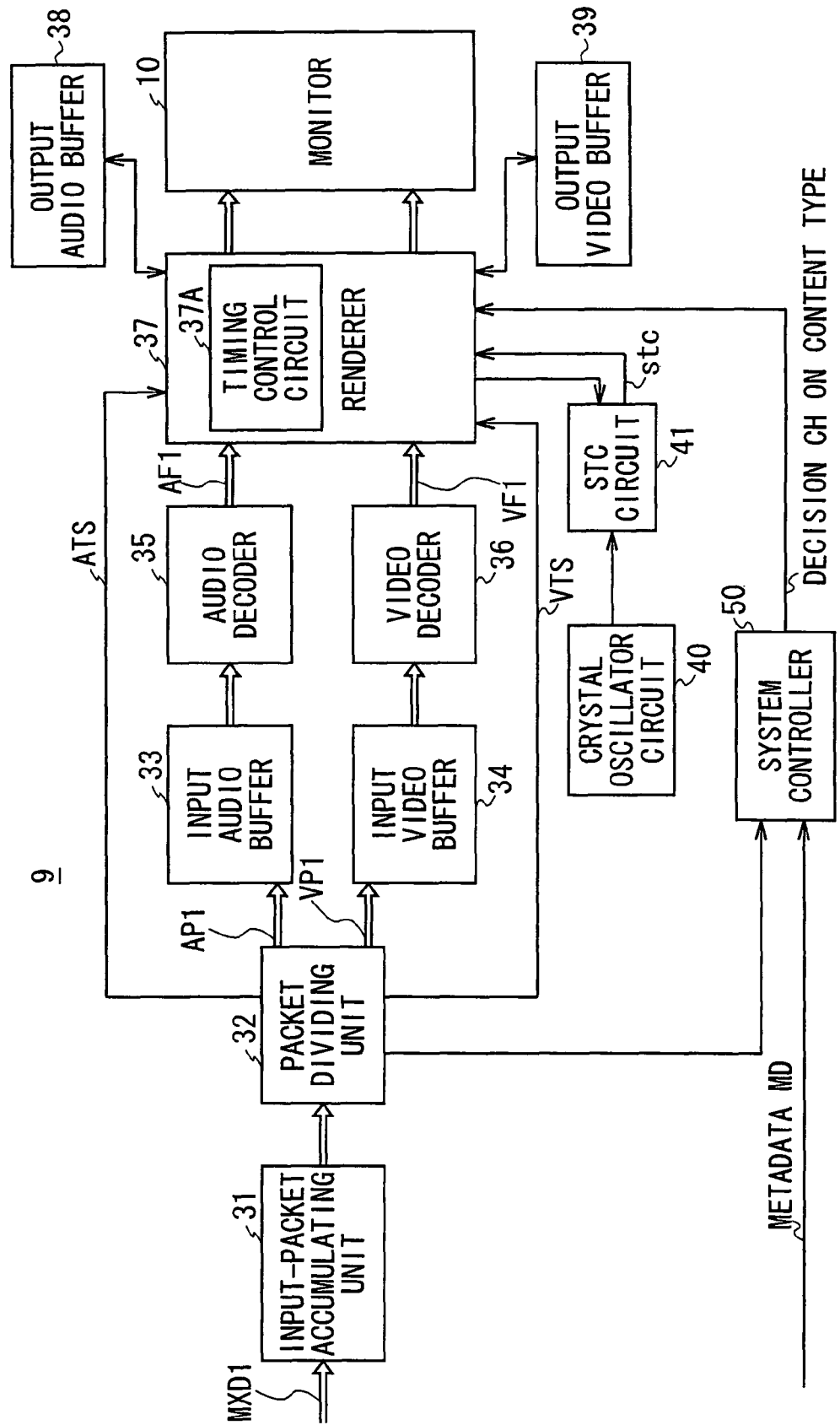
FIG. 4 is a schematic block diagram showing the module configuration of the streaming decoder provided in a first content receiving apparatus.

(3) Module Configuration of Streaming Decoder in First Content Receiving Apparatus As shown in FIG. 4, the streaming decoder 9 of the first content receiving unit 3 receives the multiplex data MXD1 transmitted from the content providing apparatus 2, using RTP/TCP. In the streaming decoder 9, the multiplex data MXD1 is temporarily stored in an input-packet accumulating unit 31 and then sent to a packet dividing unit 32.

The input-packet accumulating unit 31 outputs the multiplex data MXD1 to the packet dividing unit 32 when the amount of data MXD1 transmitted via the Internet 5 increases to a predetermined value. The packet dividing unit 32, which is connected to the output of the unit 31 can therefore keep processing the multiplex data MXD1, without break.

The packet dividing unit 32 divides the multiplex data MXD1 into video-packet data VP1 and audio-packet data AP1. The audio-packet data AP1 is transmitted, in units of audio frames, via an input audio buffer 33, that is constituted by a ring buffer, to an audio decoder 35. The video-packet data VP1 is transmitted, in units of video frames, via an input video buffer 34, that is constituted by a ring buffer, to a video decoder 36.

The input audio buffer 33 stores the audio-packet data AP1 until the audio decoder 35 connected to its output continuously decodes the audio-packet data AP1 for one audio frame. The input video buffer 34 stores the video-packet data VP1 until the video decoder 36 connected to its output continuously decodes the video-packet data VP1 for one video frame. That is, the input audio buffer 33 and input video buffer 34 have a storage capacity large enough to send one audio frame and one video frame to the audio decoder 35 and video decoder 36, respectively, instantly at any time.

The packet dividing unit 32 is designed to analyze the video-header information about the video-packet data VP1 and the audio-header information about the audio-packet data AP1, recognizing the video time-stamp VTS and the audio time-stamp ATS. The video time-stamp VTS and the audio time-stamp ATS are sent to the timing control circuit 37A provided in a renderer 37.

The audio decoder 35 decodes the audio-packet data AP1 in units of audio frames, reproducing the audio frame AF1 that is neither compressed nor coded. The audio frame AF1 is supplied to the renderer 37.

The video decoder 36 decodes the video-packet data VP1 in units of video frames, restoring the video frame VF1 that is neither compressed nor coded. The video frame VF1 is sequentially supplied to the renderer 37.

In the streaming decoder 9, the Web browser 15 supplies the metadata MD about the content to a system controller 50. The system controller 50, i.e., content-discriminating means, determines from the metadata MD whether the content consists of audio data and video data, consists of video data only, or consist of audio data only. The content type decision CH thus made is sent to the renderer 37.

The renderer 37 supplies the audio frame AF1 to an output audio buffer 38 that is constituted by a ring buffer. The output audio buffer 38 temporarily stores the audio frame AF1. Similarly, the renderer 37 supplies the video frame VF1 to an output video buffer 39. The output video buffer 39 temporarily stores the video frame VF1.

Then, in the renderer 37, the timing control circuit 37A adjusts the final output timing on the basis of the decision CH supplied from the system controller 50, the audio time-stamp ATS and the video time-stamp VTS, in order to achieve lip-sync of the video and the audio represented by the video frame VF1 and the audio frame AF1, respectively, so that the video and the audio may be output to the monitor 10. At the output timing thus adjusted, the video frame VF1 and the audio frame AF1 are sequentially output from the output video buffer 39 and output audio buffer 38, respectively.

Figure 5:
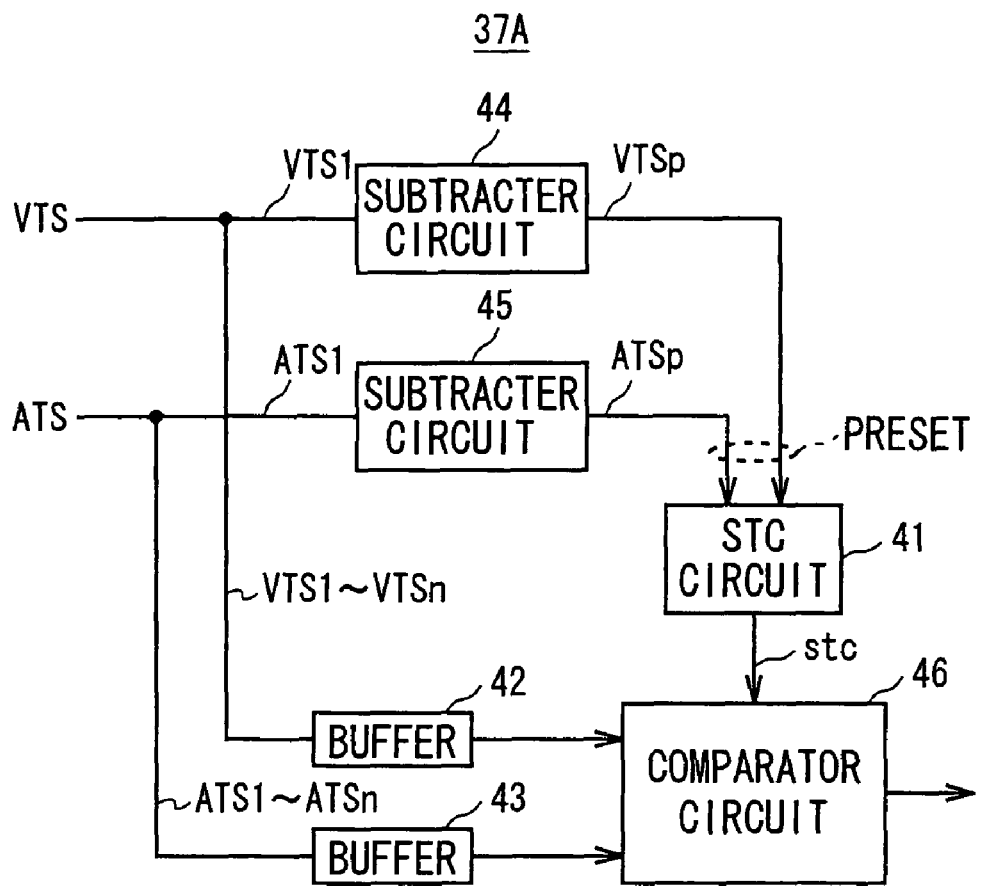
FIG. 5 is a schematic block diagram showing the configuration of a timing control circuit.

(4) Lip-sync Adjustment at Decoder Side During Pre-encoded Streaming (4-1) Adjustment of Output Timing of Video and Audio Frames During Pre-encoded Streaming As shown in FIG. 5, in the timing control circuit 37A of the renderer 37, a buffer 42 temporarily stores the video time-stamps VTSs (VTS1, VTS2, VTS3, . . . , VTSn) sent from the packet dividing unit 32, and a buffer 43 temporarily stores the audio time-stamps ATSs (ATS1, ATS2, ATS3, . . . , ATSn) sent from the packet dividing unit 32. The video time-stamps VTSs and audio time-stamps ATSs are supplied to a comparator circuit 46.

In the timing control circuit 37A, the first video time-stamp VTS1 and first audio time-stamp ATS1 in the content are supplied to a subtracter circuit 44 and a subtracter circuit 45, respectively.

The subtracter circuits 44 and 45 delay the first video time-stamp VTS1 and first audio time-stamp ATS1 by a predetermined time. The stamps VTS1 and ATS1 thus delayed are transmitted to an STC circuit 41 as a preset video time-stamp VTSp and a preset audio time-stamp ATSp.

The STC circuit 41 presets a system time clock stc to a value, in accordance with the presetting sequence defined by the order in which the preset video time-stamp VTSP and preset audio time-stamp ATSp have been input. That is, the STC circuit 41 adjusts (replaces) the value of the system time clock stc on the basis of the order of the preset video time-stamp VTSP and preset audio time-stamp ATSp have been input.

The STC circuit 41 presets the value of the system time clock stc by using the preset video time-stamp VTSp and preset audio time-stamp ATSp that have been obtained by delaying the first video time-stamp VTS1 and first audio time-stamp ATS1 by a predetermined time. Thus, when the first video time-stamp VTS1 and first audio time-stamp ATS1 arrive at the comparator circuit 46 from the buffers 42 and 43, respectively, the preset value of the system time clock stc supplied from the STC circuit 41 to the comparator circuit 46 represents a time that precedes the video time-stamp VTS1 and the audio time-stamp ATS1.

Hence, the value of the system time clock stc, which has been preset, never represents a time that follows the first video time-stamp VTS1 and the first audio time-stamp ATS1. The comparator circuit 46 of the timing control circuit 37A therefore can reliably output video frame Vf1 and audio frame Af1 that correspond to the first video time-stamp VTS1 and first audio time-stamp ATS1, respectively.

Figure 6:
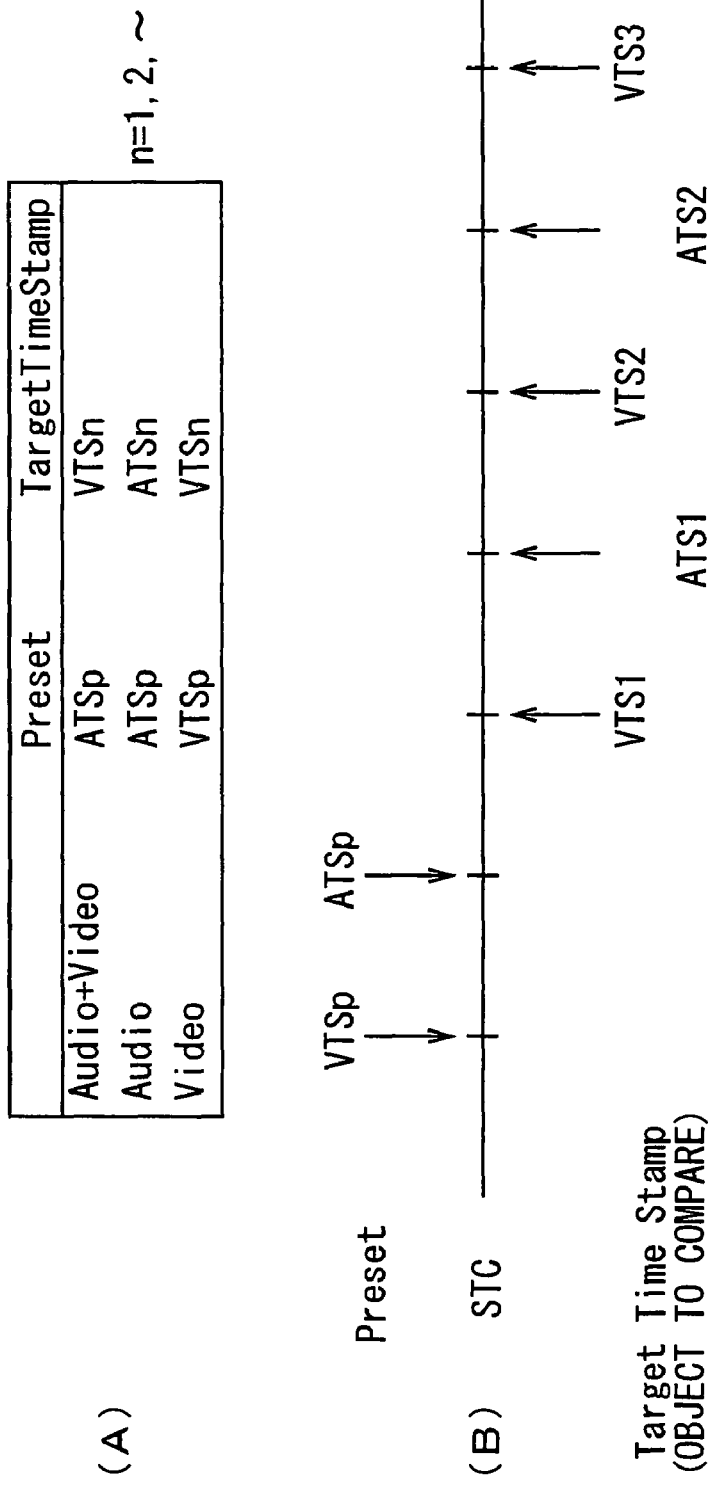
FIG. 6 is a schematic diagram depicting a time stamp that should be compared with an STC that has been preset.

If the content that is actually composed of audio data and video data as shown in FIGS. 6(A) and 6(B), the value of the system time clock stc may be preset in the presetting sequence defined by the order in which the preset video time-stamp VTSp and audio time-stamp ATSp have been input. Then, the preset value is updated, without fail, in the preset audio time-stamp ATSP after the system time clock stc has been preset in the preset video time-stamp VTSp.

At this time, the comparator circuit 46 compares the video time-stamp VTS with the audio time-stamp ATS, using the system time clock stc updated in the preset audio time-stamp ATSP, as the reference value. The comparator circuit 46 thus calculates the time difference between the system time clock stc and the video time-stamp VTS added in the content providing apparatus 2 provided at the encoder side.

On the other hand, if the content is composed of audio data only, the preset video time-stamp VTSp is never supplied to the timing control circuit 37A. Therefore, the value of the system time clock stc is preset, naturally by the preset audio time-stamp ATSp, in accordance with the presetting sequence that is defined by the order in which the preset video time-stamp VTSp and audio time-stamp ATSp have been input.

Similarly, the preset audio time-stamp ATSp is never supplied to the timing control circuit 37A if the content is composed of video data only. In this case, too, the value of the system time clock stc is preset, naturally by the preset video time-stamp VTSP, in accordance with the presetting sequence that is defined by the order in which the preset video time-stamp VTSP and audio time-stamp ATSp have been input.

If the content is composed of audio data only or video data only, the lip-sync between the video and the audio need not particularly be adjusted. It is therefore only necessary to output the audio frame AF1 when the system time clock stc preset by the preset audio time-stamp ATSp coincides in value with the audio time-stamp ATS, and to output the video frame VF1 when the system time clock stc preset by the preset video time-stamp VTSp coincides in value with the video time-stamp VTS.

Figure 7:
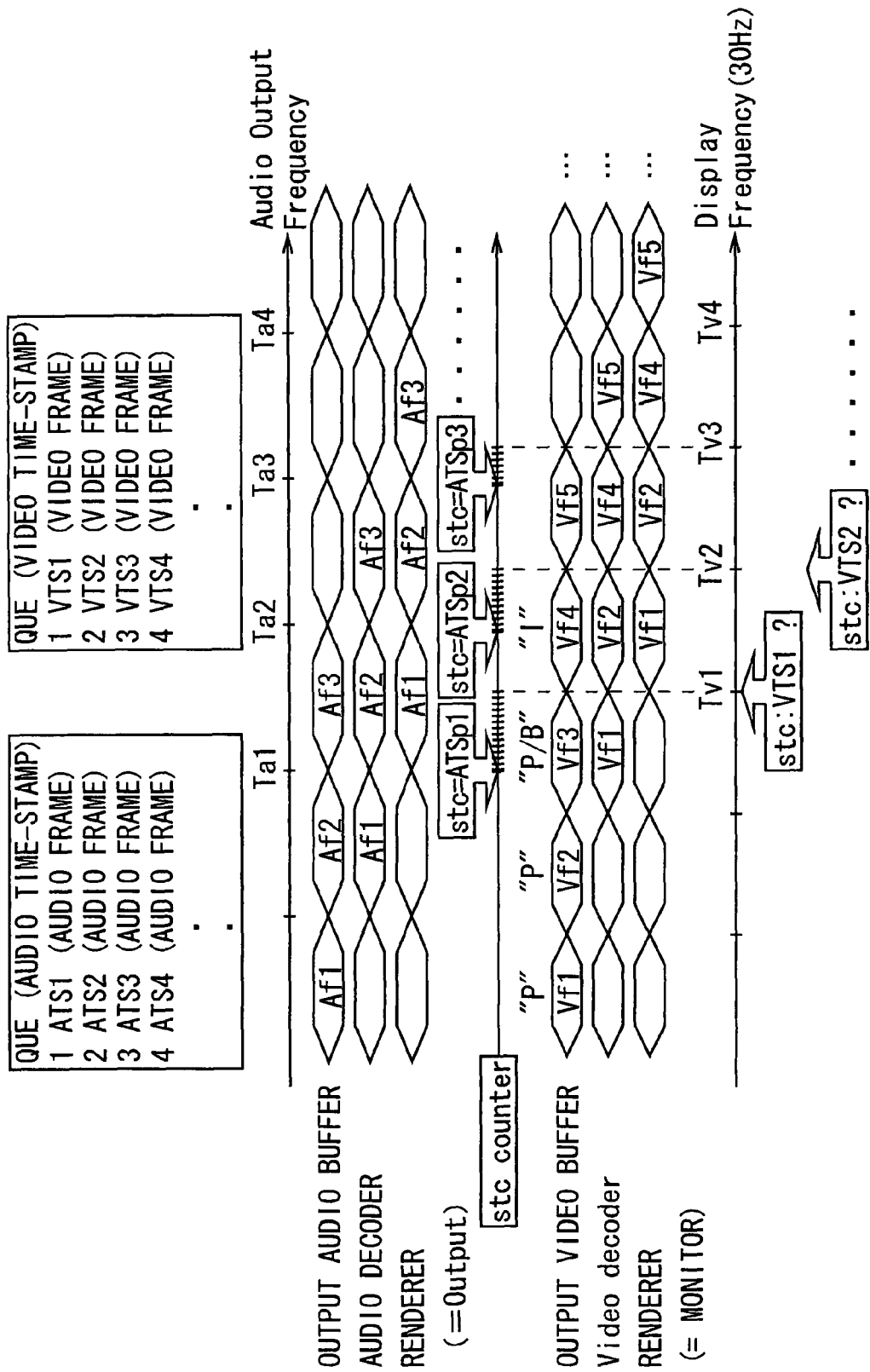
FIG. 7 is a schematic diagram for explaining the timing of outputting video frames and audio frames during a pre-encoded streaming.

Practically, in the timing control circuit 37a of the renderer 37, if the content is composed of, for example, both audio data and video data, the value of the system time clock stc supplied via a crystal oscillator circuit 40 (FIG. 4) and the STC circuit 41 is preset, first by the preset video time-stamp VTSP and then by the preset audio time-stamp ATSp, in the timing control circuit 37A of the renderer 37 at time Ta1, time Ta2, time Ta3, . . . when the audio frame AF1 (Af1, Af2, Af3, . . . ) decoded by the audio decoder 35 as shown in FIG. 7 is output to the monitor 10. The system time clock stc is thereby made equal in value to the preset audio time-stamp ATSp1, ATSp2, ATSp3, . . . .

Since any audio interrupted or any audio skipped is very conspicuous to the user, the timing control circuit 37A of the renderer 37 must use the audio frame AF1 (Af1, Af2, Af3, . . . ) as reference for the lip-sync adjustment, thereby to adjust the output timing of the video frame VF1 (Vf1, Vf2, Vf3, . . . ) to that of the audio frame AF1 (Af1, Af2, Af3, . . . ).

In the timing control circuit 37A of the renderer 37, once the timing of outputting the audio frame AF1 (Af1, Af2, Af3, . . . ) (i.e., time Ta1, time Ta2, time Ta3, . . . ) has been set, the comparator circuit 46 compares the count value of the system time clock stc, which has been preset, with the video time-stamp VTS (VTS1, VTS2, VTS3, . . . ) added to the video frame VF1 (Vf1, Vf2, Vf3, . . . ), at time Tv1, time Tv2, time Tv3, . . . when the video frame VF1 (Vf1, Vf2, Vf3, . . . ) is output at frame frequency of 30[Hz] based on the system time clock stc.

When the comparator circuit 46 finds that the count value of the system time clock stc, which has been preset, coincides with the video time-stamp VTS (VTS1, VTS2, VTS3, . . . ), the output video buffer 39 outputs the video frame VF1 (Vf1, Vf2, Vf3, . . . ) to the monitor 10.

Upon comparing the count value of the system time clock stc, which has been preset, coincides with the video time-stamp VTS (VTS1, VTS2, VTS3, . . . ) sent from the buffer 42, the comparator circuit 46 may find a difference between the count value of the preset system time clock stc and the video time-stamp VTS (VTS1, VTS2, VTS3, . . . ). If this difference D1 (time difference) is equal to or smaller than a threshold value TH that represents a predetermined time, the user can hardly recognize that the video and the audio are asynchronous. It is therefore sufficient for the timing control circuit 37A to output the video frame VF1 (Vf1, Vf2, Vf3, . . . ) to the monitor 10 when the count value of the preset system time clock stc coincides with the video time-stamp VTS (VTS1, VTS2, VTS3, . . . ).

In any other case, for example, if the difference D1 between the count value of the preset system time-clock stc and the video time-stamp VTS2 is greater than the threshold value TH at time Tv2 and the video data is delayed with respect to the audio data, the video data will fall behind the audio data because of the gap between the clock frequency for the encoder side and the clock frequency for the decoder side. Therefore, the timing control circuit 37A provided in the renderer 37 does not decode, but skips, the video frame Vf3 (not shown) corresponding to, for example, B picture of a GOP (Group Of Pictures) and outputs the next video frame Vf4.

In this case, the renderer 37 does not skip the "P" picture stored in the output video buffer 39, because the "P" picture will be used as a reference frame in the process of decoding the next picture in the video decoder 36. Instead, the renderer 37 skips "B" picture, or a non-reference frame, which cannot be used as a reference frame in generating the next picture. Lip-sync is thereby accomplished, while preventing degradation of video quality.

The output video buffer 39 may not store the "B" picture that the renderer 37 should skip but stores "I" and "P" pictures. The renderer 37 cannot skip the "B" picture. Then the audio data cannot catch up with the audio data.

Figure 8:
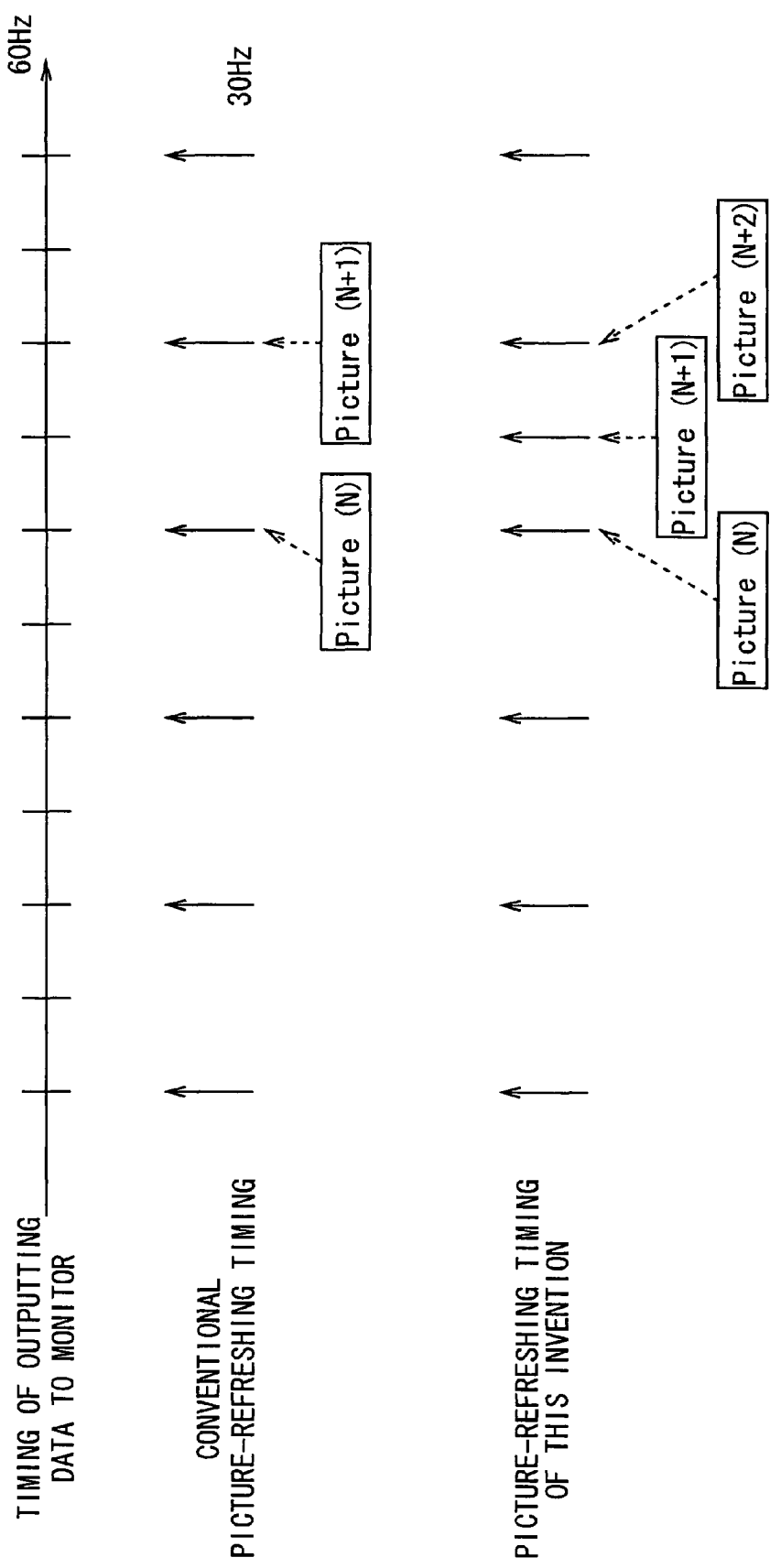
FIG. 8 is a schematic diagram for explaining the process of outputting video frames of I pictures and P pictures.

If the output video buffer 39 does not store the "B" that the renderer 37 should skip. Then, the picture-refreshing time is shortened, utilizing the fact that the output timing for the monitor 10 and the picture-refreshing timing for the video frame VF1 to output from the output video buffer 39 are 60 [Hz] and 30 [Hz], respectively, as is illustrated in FIG. 8.

More specifically, the difference D1 between the count value of the system time clock stc, which has been preset by the preset audio time-stamp ATPs, and the video time-stamp VTS may exceed 16.666 . . . [msec]. In other words, if the monitor-output timing is delayed by one or more frames with respect to the audio output timing, the renderer 37 does not skip the video frame VF1, but changes the picture-refreshing timing from 30[Hz] to 60[Hz], thereby to output the next picture, i.e., (N+1)th picture.

That is, the renderer 37 shortens the picture-refreshing intervals, from 1/30 second to 1/60 second, thereby skipping "I" pictures and "P" pictures. The video data can therefore catch up with the audio data, without degrading the video quality, notwithstanding the skipping of the "I" and "P" pictures.

At time Tv2, the difference D1 between the count value of the system time clock stc, which has been preset, and the video time-stamp VTS2 may exceed the predetermined threshold value TH and the audio data may be delayed with respect to the video data. In this case, the audio data falls behind due to the gap between the clock frequency for the encoder side and the frequency for the decoder side. Therefore, the timing control circuit 37A of the renderer 37 is configured to output the video frame Vf2 repeatedly.

If the content is composed of video data only, the timing control circuit 37A of the renderer 37 only needs to output to the monitor 10 the video frames VF1 (Vf1, Vf2, Vf3, . . . ) decoded by the video decoder 36 sequentially at time Tv1, time Tv2, time Tv3, at each of which the count value of the system time clock stc, which has been preset by using the preset video time-stamp VTSp, coincides with the video time-stamp VTS.

Similarly, if the content is composed of audio data only, the timing control circuit 37A of the renderer 37 only needs to output to the monitor 10 the audio frames AF1 (Af1, Af2, Af3, . . . ) decoded by the audio decoder 35 sequentially at time Ta1, time Ta2, time Ta3, . . . , at each of which the count value of the system time clock stc, i.e., the value preset by the preset audio time-stamp ATPs, coincides with the audio time-stamp ATS.

(4-2) Sequence of Adjusting Lip-sync During Pre-encoded Streaming

Figure 9:
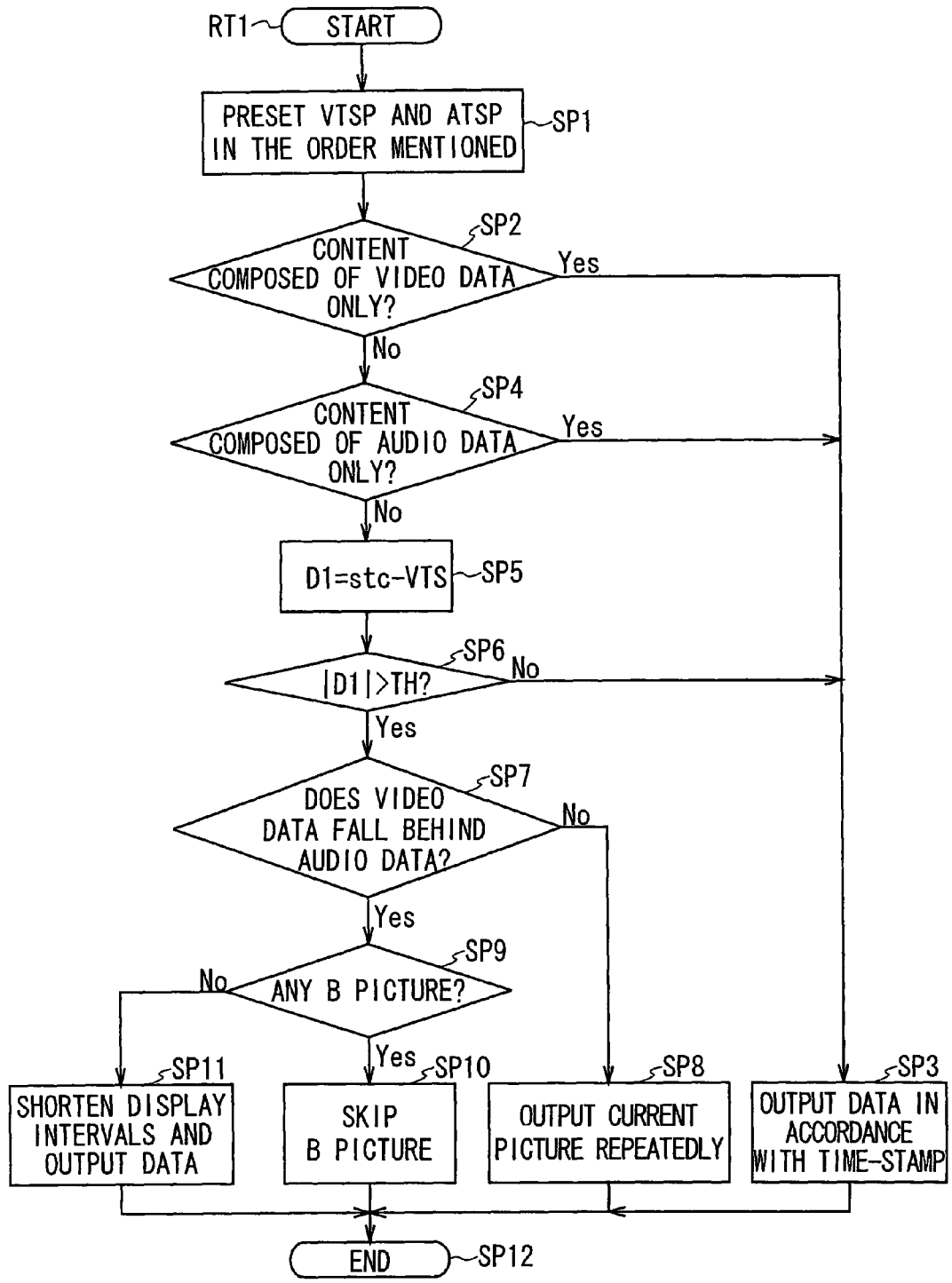
FIG. 9 is a flowchart illustrating the sequence of adjusting the lip-sync during the pre-encoded streaming.

As described above, the timing control circuit 37A of the renderer 37 that is provided in the streaming decoder 9 adjusts the timing of outputting the video frames VF1 (Vf1, Vf2, Vf3, . . . ) by using the audio frames AF1 (Af1, Af2, Af3, . . . ), thereby accomplishing the lip-sync of the video data and the audio data. This method of adjusting the output timing will be summarized. As seen from the flowchart of FIG. 9, the timing control circuit 37A of the renderer 37 starts the routine RT1. Then, the renderer 37 goes to Step SP1.

In Step SP1, the renderer 37 presets the value of the system time clock stc in accordance with the presetting sequence defined by the order in which the preset video time-stamp VTSp and audio time-stamp ATSp have been input. Then, the process goes to Step SP2.

In Step SP2, if the content is composed of audio and video data, the renderer 37 updates, without fail, the preset value by using the preset audio time-stamp ATSp after the value of the system time clock stc has been preset by the video time-stamp VTSp. Then, the renderer 37 goes to Step SP2.

In this case, the value of the system time clock stc coincides with the preset audio time-stamp ATSp (ATSp1, ATSp2, ATSp3, . . . ) at time Ta1, time Ta2, time Ta3, . . . (FIG. 7) when the audio frames AF1 (Af1, Af2, Af3, . . . ) are output to the monitor 10.

If the content is composed of video data only, the preset audio time-stamp ATSp is not available. Therefore, the renderer 37 goes to Step SP2 upon lapse of a predetermined time after the value of the system time clock stc is preset by the preset video time-stamp VTSp.

If the content is composed of audio data only, the preset video time-stamp VTSp is not available. Therefore, the renderer 37 goes to Step SP2 at the time the preset audio time-stamp ATSP arrives, not waiting for the preset video time-stamp VTSp, after the value of the system time-clock stc is preset.

In Step SP2, the renderer 37 determines whether the content is composed of video data only, on the basis of the content type decision CH supplied from the system controller 50. If Yes, the renderer 37 goes to Step SP3.

In Step SP3, the renderer 37 outputs the video frame VF1 (Vf1, Vf2, Vf3, . . . ) to the monitor 10 when the count value of the system time clock stc, which has been preset by the preset video time-stamp VTPs, coincides with the video time-stamp VTS. This is because the content is composed of video data only. The renderer 37 goes to Step SP12 and terminates the process.

The decision made in Step SP2 may be No. This means that the content is not composed of video data only. Rather, this means that the content is composed of audio data and video data, or of audio data only. In this case, the renderer 37 goes to Step SP4.

In Step SP4, the renderer 37 determines whether the content is composed of audio data only, on the basis of the content type decision CH. If Yes, the renderer 37 goes to Step SP3.

In Step SP3, the renderer 37 causes the speaker of the monitor 10 to output the audio frame AF1 (Af1, Af2, Af3, . . . ) when the count value of the system time clock stc, which has been preset by the preset audio time-stamp ATSp, coincides with the audio time-stamp ATS. This is because the content is composed of audio data only. The renderer 37 then goes to Step SP12 and terminates the process.

The decision made in Step SP4 may be No. This means that the content is composed of audio data and video data. If this is the case, the renderer 37 goes to Step SP5.

In Step SP5, the renderer 37 finally calculates the difference D1 (=stc−VTS) between the count value of the system time clock stc, which has been preset by the preset audio time-stamp ATSp, and the time-stamp VTS (VTS1, VTS2, VTS3, . . . ) of the video frames VF1 (Vf1, Vf2, Vf3, . . . ) that should be output at time Tv1, time Tv2, time Tv3, . . . . This is because the content is composed of audio data and video data. The renderer 37 goes to Step SP6.

In Step SP6, the renderer 37 determines whether the difference D1 (absolute value) calculated in Step SP7 is greater than a predetermined threshold value TH. The decision made here may be No. This means that the difference D1 is so short a time (e.g., 100[msec] or less) that the user watching the video and hearing the audio cannot notice the gap between the video and the audio. Thus, the renderer 37 goes to Step SP3.

In Step SP3, the renderer 37 outputs the video frame VF1 to the monitor 10 because the time difference is so small that the user can hardly feel the gap between the video and the audio. The renderer 37 outputs the audio frame AF1, too, to the monitor 10, in principle. Then, the renderer 37 goes to Step SP12 and terminates the process.

On the contrary, the decision made in Step SP6 may be Yes. This means that the difference D1 is greater than the threshold value TH. Thus, the user can notice the gap between the video and the audio. In this case, the renderer 37 goes to next Step SP7.

In Step SP7, the renderer 37 determines whether the video falls behind the audio, on the basis of the audio time-stamp ATS and the video time-stamp VTS. If No, the renderer 37 goes to Step SP8.

In Step SP8, the renderer 37 repeatedly outputs the video frame VF1 constituting the picture being displayed, so that the audio falling behind the video may catch up with the video. Then, the renderer 37 goes to Step SP12 and terminates the process.

The decision made in Step SP7 may be Yes. This means that the video falls behind the audio. In this case, the renderer 37 goes to Step SP9. In Step SP9, the renderer 37 determines whether the output video buffer 39 stores "B" picture that should be skipped. If Yes, the renderer 37 goes to Step SP10.

In Step SP10, the renderer 37 outputs, skipping the "B" picture (i.e., video frame Vf3 in this instance) without decoding the "B" picture, so that the video may catch up with the audio. As a result, the video catches up the audio, thus achieving the lip-sync of the video and audio. The renderer 37 then goes to Step SP12 and terminates the process.

The decision made in Step SP9 may be No. This means that the output video buffer 39 stores no "B" picture that should be skipped. Thus, there is no "B" picture to be skipped. In this case, the renderer 37 goes to Step SP11.

In Step SP11, the renderer 37 shortens the picture-refreshing intervals toward the output timing of the monitor 10, utilizing the fact that the output timing of the monitor 10 is 60[Hz] and the picture-refreshing timing is 30[Hz] for the video frame VF1 as illustrated in FIG. 8. The picture is thus skipped, whereby the video can catch up with the audio, without degrading the quality of the video. The renderer 37 then goes to Step SP12 and terminates the process.

(5) Circuit Configuration of Real-time Streaming Encoder in First Content Receiving Apparatus The first content receiving apparatus 3 (FIG. 1) can be used as a content providing side when it relays, by radio, contents to the second content receiving apparatus 4 after the real-time streaming encoder 11 has encoded the contents in real time. These contents are, for example, digital terrestrial broadcast content or BS/CS digital contents or analog terrestrial broadcast content, which have been externally supplied, or contents which have been played back from DVDs, Video CDs or ordinary video cameras.

Figure 10:
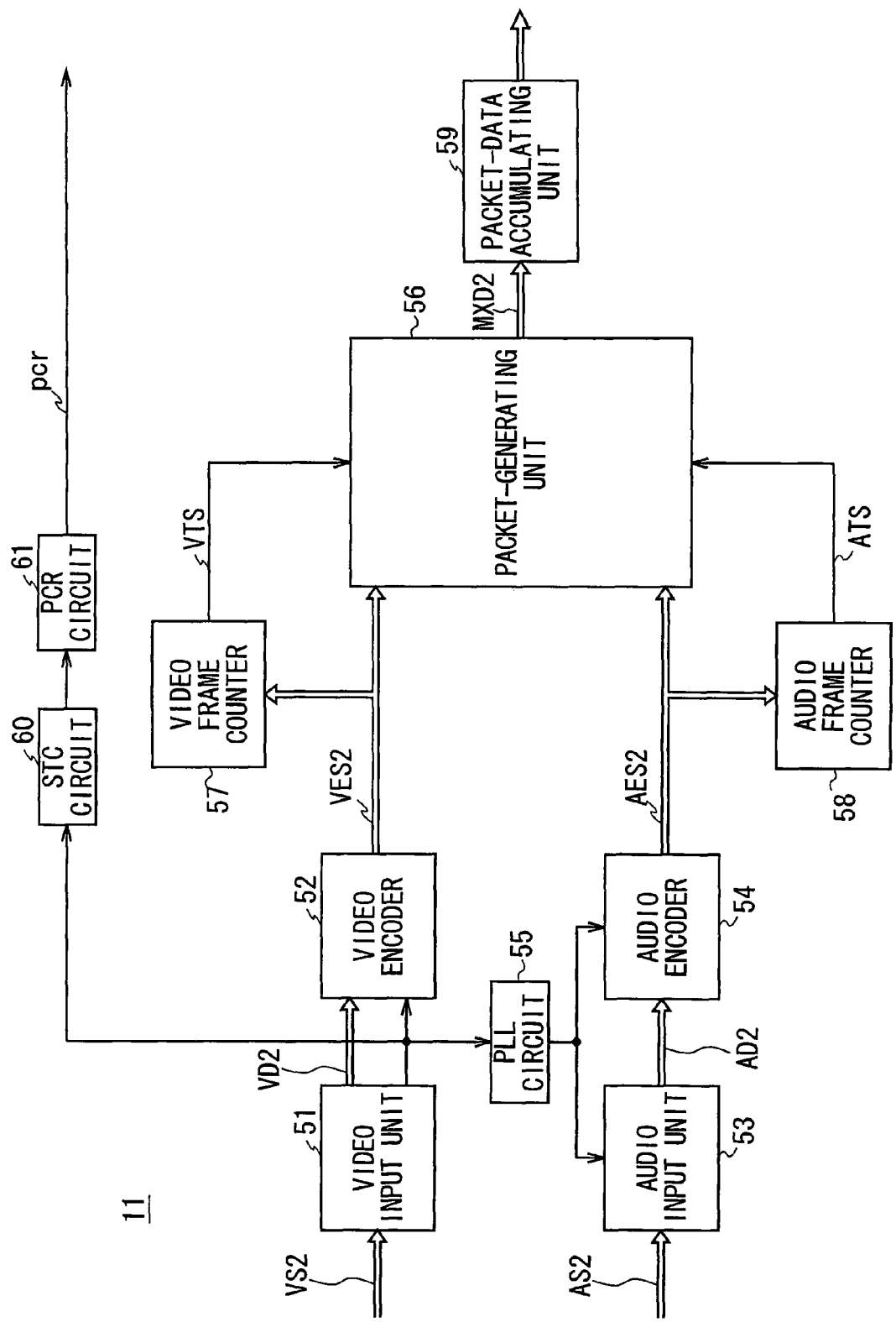
FIG. 10 is a schematic block diagram showing the circuit configuration of the real-time streaming encoder provided in the first content receiving apparatus.

The circuit configuration of the real-time streaming encoder 11 provided in the first content receiving apparatus 3 will be described, with reference to FIG. 10. The real-time streaming encoder 11 receives a video signal VS2 and an audio signal AS2 that constitute an externally supplied content. In the encoder 11, a video input unit 51 converts the video signal VS2 to digital video data, and an audio input unit 53 converts the audio signal AS2 to digital audio data. The digital video data is sent, as video data VD2, to a video encoder 52. The digital audio data is sent, as audio data AD2, to an audio encoder 54.

The video encoder 52 compresses and encodes the video data VD2 by a prescribed data compressing coding method or various data compressing coding methods either complying with, for example, MPEG1/2/4 standards. The resultant video elementary stream VES2 is supplied to a packet-generating unit 56 and a video frame counter 57.

The video frame counter 57 counts the frame-frequency units (29.97 [Hz], 30 [Hz], 59.94 [Hz] or 60 [Hz]) of the video elementary stream VES2. The counter 57 converts the resultant count-up value to a 90 [KHz]-unit value based on the reference clock. This value is supplied to the packet-generating unit 56, as 32-bit video time-stamp VTS (VTS1, VTS2, VTS3, . . . ) for each video frame.

Meanwhile, the audio encoder 54 compresses and encodes the audio data AD2 by a prescribed data compressing coding method or various data compressing coding method, either complying with MPEG1/2/4 audio standards. The resultant audio elementary stream AES2 is supplied to the packet-generating unit 56 and an audio frame counter 58.

Like the video frame counter 57, the audio frame counter 58 converts the count-up value of audio frames to a 90 [kHz]-unit value based on the reference clock. This value is supplied to the packet-generating unit 56, as 32-bit audio time-stamp ATS (ATS1, AST2, ATS3, . . . ) for each video frame.

The packet-generating unit. 56 divides the video elementary stream VES2 into packets of a preset size and adds header data to each packet thus obtained, thereby generating video packets. Further, the packet-generating unit 56 divides the audio elementary stream AES2 into packets of a preset size and adds audio header data to each packet thus obtained, thereby providing audio packets.

Figure 11:
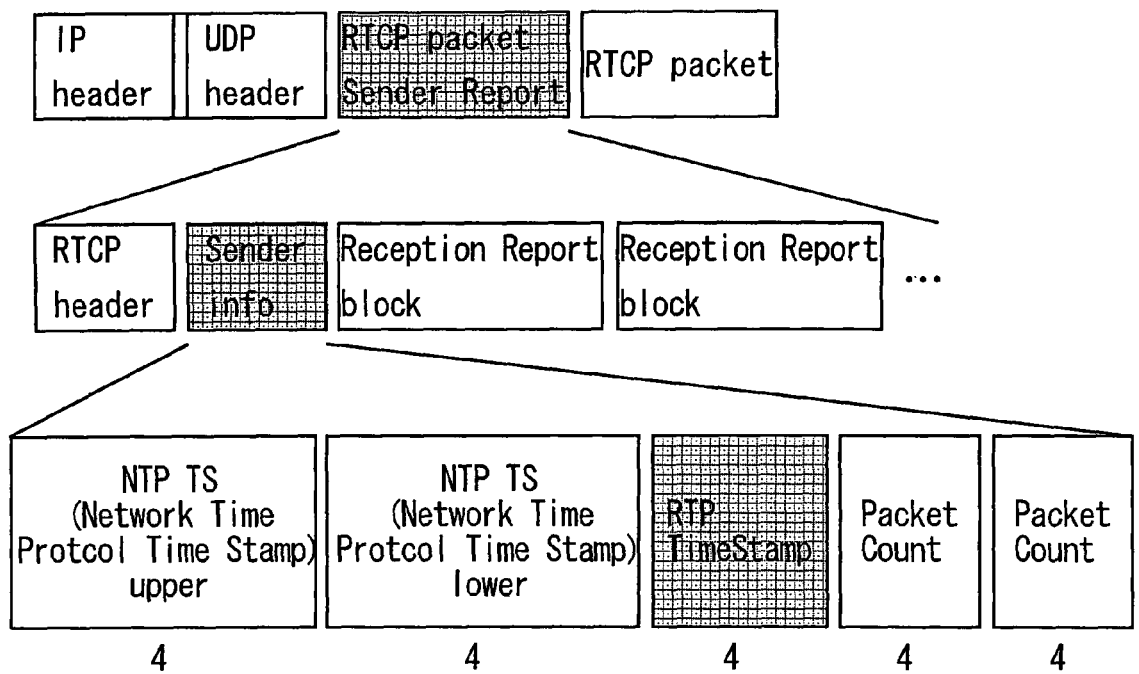
FIG. 11 is a schematic diagram depicting the structure of a PCR (UDP protocol) contained in a control packet.

As shown in FIG. 11, the control packet added to the head of an RTCP (Real Time Control Protocol) packet consists of an IP (Internet Protocol) header, a UDP (User Datagram Protocol) header, an RTCP (Real Time Control Protocol) packet sender report, and an RTCP packet. The IP header is used to achieve the inter-host communication for the Internet layer. The UDP header is used to transfer user datagram data. The RTCP packet sender report is used to transfer real-time data and has a 4-bytes RTP-time stamp region. In the RTP-time stamp region, snapshot information about the value of the system time clock for the encoder side can be written as a PCR (Program Clock Reference) value. The PCR value can be transmitted from a PCR circuit 61 provided for clock recovery at the decoder side.

The packet-generating unit 56 generates video-packet data consisting of a predetermined number of bytes, from a video packet and a video time-stamp VTS. The unit 56 generates audio-packet data consisting of a predetermined number of bytes, too, from an audio packet and an audio time-stamp ATS. The unit 56 multiplexes these data items, generating multiplex data MXD2. The data MXD2 is sent to a packet-data accumulating unit 59.

When the amount of the multiplex data MXD2 accumulated in the packet-data accumulating unit 59 reaches a predetermined value, the multiplex data MXD2 is transmitted via the wireless LAN 6 to the second content receiving apparatus 4, using RTP/TCP.

In the real-time streaming encoder 11, the digital video data VD2 generated by the video input unit 51 is supplied to a PLL (Phase-Locked Loop) circuit 55, too. The PLL circuit 55 synchronizes an STC circuit 60 to the clock frequency of the video data VD2, on the basis of the video data VD2. Further, the PLL circuit 55 synchronizes the video encoder 52, the audio input unit 53 and the audio encoder 54 to the clock frequency of the video data VD2, too.

Therefore, in the real-time streaming encoder 11, the PLL circuit 55 can perform a data-compressing/encoding process on the video data VD2 and audio data AD2 at timing that is synchronous with the clock frequency of the video data VD2. Further, a clock reference pcr that is synchronous with the clock frequency of the video data VD2 can be transmitted to the real-time streaming decoder 12 provided in the second content receiving apparatus 4, through the PCR (Program Clock Reference) circuit 61.

At this time, the PCR circuit 61 transmits the clock reference pcr to the real-time streaming decoder 12 provided in the second content receiving apparatus 4, by using the UDP (User Datagram Protocol) which is a layer below the RTP protocol and which should work in real time. Thus, the circuit 61 can accomplish live streaming, not only in real time but also at high peed.

Figure 12:
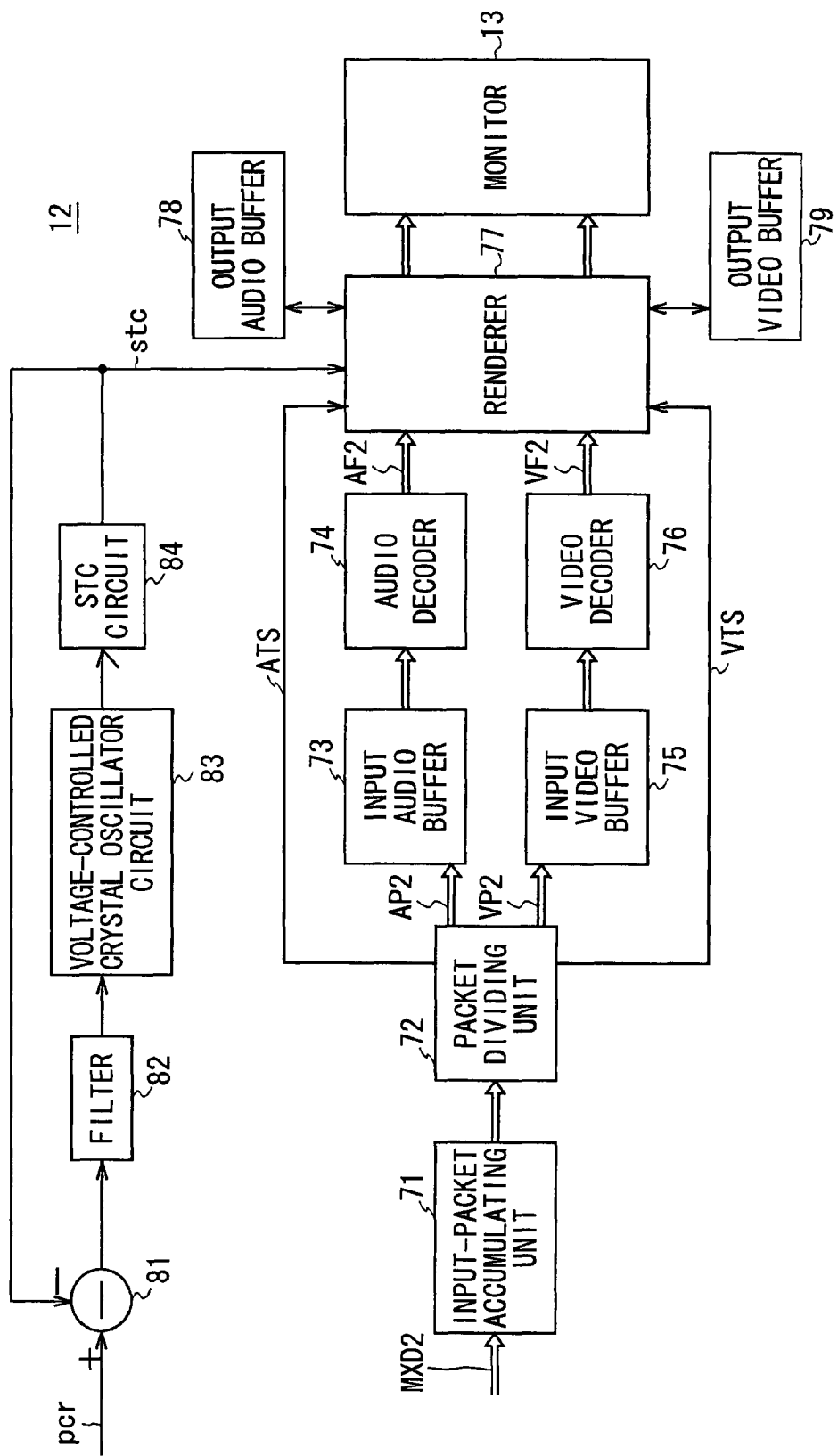
FIG. 12 is a schematic block diagram showing the circuit configuration of the real-time streaming decoder provided in a second content receiving apparatus.

(6) Circuit Configuration of the Real-Time Streaming Decoder in Second Content Receiving Apparatus As shown in FIG. 12, in the real-time streaming decoder 12 provided in the second content receiving apparatus 4, the multiplex data MXD2 transmitted from the real-time streaming encoder 11 provided in the first content receiving apparatus 3 is temporarily stored in an input-packet accumulating unit 71. The multiplex data MXD2 is then sent to a packet dividing unit 72.

The packet dividing unit 72 divides the multiplex data MXD2 into video-packet data VP2 and audio-packet data AP2. The audio-packet data AP2 is transmitted, in units of audio frames, via an input audio buffer 73 constituted by a ring buffer to an audio decoder 74. The video-packet data VP2 is transmitted, in units of video frames, via an input video buffer 75 constituted by a ring buffer to a video decoder 76.

The input audio buffer 73 stores the audio-packet data AP2 until the audio decoder 74 connected to its output continuously decodes the audio-packet data AP2 for one audio frame. The input video buffer 75 stores the video-packet data VP2 until the video decoder 76 connected to its output continuously decodes the video-packet data VP2 for one audio frame. Therefore, the input audio buffer 73 and input video buffer 75 only need to have a storage capacity large enough to store one audio frame and one video frame, respectively.

The packet dividing unit 72 is designed to analyze the video-header information about the vide-packet data VP2 and the audio-header information about the audio-packet data AP2, recognizing the audio time-stamp ATS and the video time-stamp VTS. The audio time-stamp ATS and the video time-stamp VTS are sent to a renderer 77.

The audio decoder 74 decodes the audio-packet data AP2 in units of audio frames, reproducing the audio frame AF2 that is neither compressed nor coded. The audio frame AF2 is supplied to the renderer 77.

The video decoder 76 decodes the video-packet data VP2 in units of video frames, restoring the video frame VF2 that is neither compressed nor coded. The video frame VF2 is sequentially supplied to the renderer 77.

The renderer 77 supplies the audio frame AF2 to an output audio buffer 78 that is constituted by a ring buffer. The output audio buffer 78 temporarily stores the audio frame AF2. Similarly, the renderer 77 supplies the video frame VF2 to an output video buffer 79 that is constituted by a ring buffer. The output video buffer 79 temporarily stores the video frame VF2.

Then, the renderer 77 adjusts the final output timing on the basis of the audio time-stamp ATS and the video time-stamp VTS, in order to achieve lip-sync of the video and the audio represented by the video frame VF2 and the audio frame AF2, respectively, so that the video and the audio may be output to the monitor 13. Thereafter, at the output timing thus adjusted, the audio frame AF2 and the video frame VF2 are sequentially output from the output audio buffer 78 and output video buffer 79, respectively, to the monitor 13.

The real-time streaming decoder 12 receives the clock reference pcr sent, by using UDP, from the PCR circuit 61 provided in the real-time streaming encoder 11 of the first content receiving apparatus 3. In the decoder 12, the clock reference pcr is input to a subtracting circuit 81.

The subtracting circuit 81 calculates the difference between the clock reference pcr and the system time clock stc supplied from an STC circuit 84. This difference is fed back to the subtracting circuit 81 through a filter 82, a voltage-controlled crystal oscillator circuit 83 and the STC circuit 84, forming a PLL (Phase-Locked Loop) circuit 55. The difference therefore converges to the clock reference pcr of the real-time streaming encoder 11. Finally, the PLL circuit 55 supplies to the renderer 77 a system time clock stc made synchronous with the real-time streaming encoder 11 by using the clock reference pcr.

Thus, the renderer 77 can adjust the timing of outputting the video frame VF2 and audio frame AF2, using as reference the system time clock stc that is synchronous with the clock frequency for compression coding the video data VD2 and audio data AD2 or counting the video time-stamp VTS and audio time-stamp ATS in the real-time streaming encoder 11 of the first content receiving apparatus 3.

The renderer 77 supplies the audio frame AF2 to the output audio buffer 78 constituted by a ring buffer. The output audio buffer 78 temporarily stores the audio frame AF2. Similarly, the renderer 77 supplies the video frame VF2 to the output video buffer 79 constituted by a ring buffer. The output video buffer 79 temporarily stores the video frame VF2. In order to achieve lip-sync of the video and the audio, the renderer 77 adjusts the output timing on the basis of the system time clock stc, the audio time-stamp ATS and the video time-stamp VTS, the system time clock stc being made synchronous with the encoder side by using the clock reference pcr supplied from the PCR circuit 61 of the real-time streaming encoder 11.

Figure 13:
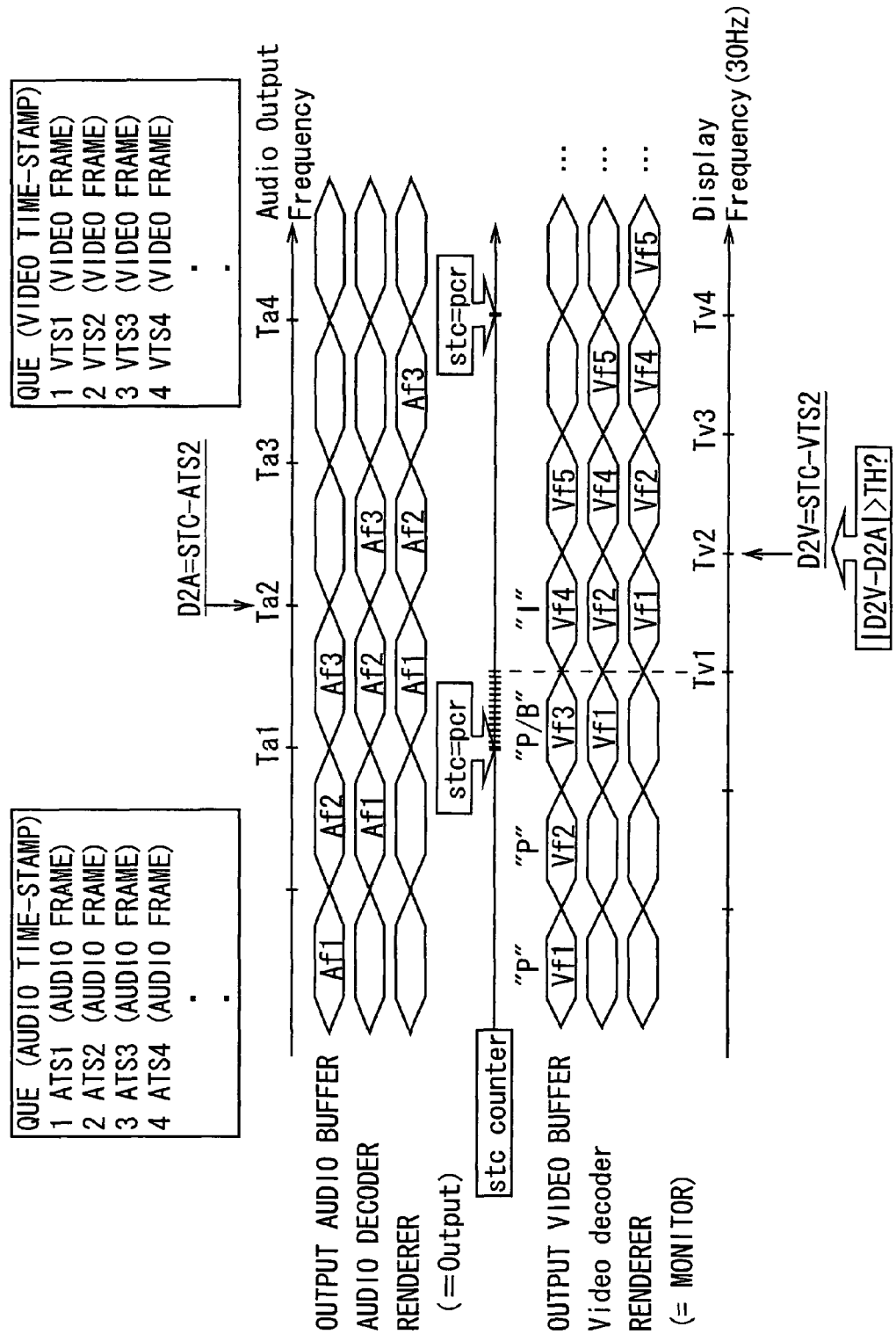
FIG. 13 is a schematic diagram for explaining the timing of outputting video frames and audio frames during a live streaming.

(7) Lip-sync Adjustment at Decoder Side During Live Streaming (7-1) Method of Adjusting Timing of Outputting Video Frames and Audio Frames During Live Streaming In this case, as shown in FIG. 13, the renderer 77 causes the PLL circuit 55 to lock the clock frequency of the system time clock stc at the value of the clock reference pcr supplied at predetermined intervals from the PRC circuit 61 of the real-time streaming encoder 11. Then, the renderer 77 causes the monitor 13 synchronized on the basis of the system time clock stc to output the audio frame AF2 and the video frame AF2 in accordance with the audio time-stamp ATS and the video time-stamp VTS, respectively.

While the clock frequency of the system time clock stc remains synchronized with the value of the clock reference pcr, the renderer 77 outputs the audio frame AF2 (Af1, Af2, Af3, ... ) sequentially to the monitor 13 in accordance with the system time clock stc and the audio time-stamp ATS (ATS1, ATS2, ATS3, ... ).

As described above, the value of the clock reference pcr and the clock frequency of the system time clock stc are synchronous with each other. Therefore, a difference D2V will not develop between the count value of the system time clock stc and the video time-stamp VTS (VTS1, VTS2, VTS3, ... ), for example, video time-stamp VTS1, at time Tv1.

However, the clock reference pcr supplied from the PCR circuit 61 of the real-time streaming encoder 11 has been transmitted by using UDP and strictly in real time. To ensure high-speed transmission, the clock reference pcr will not be transmitted again. Therefore, the clock reference pcr may fail to reach the real-time streaming decoder 12 of the second content receiving apparatus 4 or may contain erroneous data when it reaches the decoder 12.

In such a case, gap may develop between the value of the clock reference pcr supplied from the PCR circuit 61 of the real-time streaming encoder 11 at predetermined intervals and the clock frequency of the system time clock stc as the clock reference pcr goes through the PLL circuit 55. In this case, too, the renderer 77 according to the present invention can guarantee lip-sync.

In the present invention, the continuous outputting of audio data has priority so that the lip-sync is ensured if gap develops between the system time clock stc and the audio time-stamp ATS and between the system time clock stc and the video time-stamp VTS.

The renderer 77 compares the count value of the system time clock stc with the audio time-stamp ATS2 at time Ta2 when the audio frame AF2 is output. The difference D2A found is stored. The renderer 77 compares the count value of the system time clock stc with the video time-stamp VTS2 at time Tv2 when the video frame VF2 is output. The difference D2V found is stored.

At this time, the clock reference pcr reliably reaches the real-time streaming decoder 12 of the second content receiving apparatus 4, the value of clock reference pcr completely coincides with the clock frequency of the system time clock stc of the real-time streaming decoder 12 because the system time clock stc has passed through the PLL circuit 55, and the decoder side including the monitor 13 may be synchronous with the system time clock stc. Then, the difference D2V and the difference D2A are "0".

The audio frame AF2 is considered to have been advanced if the difference D2A has a positive value, and considered to have been delayed if the difference D2A has a negative value. Similarly, the video frame VF2 is considered to have been advanced if the difference D2V has a positive value, and considered to have been delayed if the difference D2V has a negative value.

No matter whether the audio frame AF2 is advanced or delayed, the renderer 77 puts priority to the continuous outputting of audio data. That is, the renderer 77 controls the outputting of the video frame VF2 with respect to the outputting of the audio frame AF2, as will be described below.

For example, when D2V-D2A is greater than the threshold value TH at time Tv2. In this case, the video has not catch up with the audio if the difference D2V is greater than the difference D2A. Therefore, the renderer 77 skips, or does not decode, the video frame Vf3 (not shown) corresponding to, for example, B picture that constitutes GOP, and outputs the next video frame Vf4.

In this case, the renderer 77 does not skip the "P" picture stored in the output video buffer 79, because the video decoder 76 will use the "P" picture as reference frame to decode the next picture. The renderer 77 therefore skips the "B" picture that is a non-reference frame. Thus, lip-sync can be achieved, while preventing degradation of the image.

When D2V-D2A is greater than the threshold value TH and the difference D2A is greater than the difference D2V. In this case, the video cannot catch up with the audio. Therefore, the renderer 77 repeatedly outputs the video frame Vf2 being output now.

If the D2V-D2A is smaller than the threshold value TH, the time by which the video is delayed with respect to the audio is considered to fall within a tolerance. Then, the renderer 77 outputs the video frame VF2 to the monitor 13.

If the output video buffer 79 stores the "I" picture and the "P" picture, but does not store the "B" picture that should be skipped, the "B" picture therefore cannot be skipped. Therefore, the video cannot catch up with the audio.

Like the renderer 37 of the streaming decoder 9 provided in the first content receiving apparatus 3, the renderer 77 shortens the picture-refreshing intervals, utilizing the fact that the output timing of the monitor 13 is, for example, 60[Hz] and the picture-refreshing timing is 30[Hz] for the video frame VF2 that should be output from the output video buffer 79 when there is not "B" pictures to skip.

More specifically, when the difference between the system time clock stc synchronous with the clock reference pcr and the video time-stamp VTS exceeds 16.666 ... [msec]. In other words, the monitor-output timing is delayed by one or more frames with respect to the audio output timing. In this case, the renderer 77 does not skip one video frame, but changes the picture-refreshing timing from 30 [Hz] to 60 [Hz], thereby to shorten the display intervals.

That is, the renderer 77 shortens the picture-refreshing intervals for the "I" picture and the "P" picture that suffer the image degradation by the skip from 1/30 sec to 1/60 sec, thereby causing the video to catch up with the audio, without degrading the video quality in spite of the skipping of the "I" picture and the "P" picture.

(7-2) Sequence of Adjusting Lip-sync During Live Streaming

Figure 14:
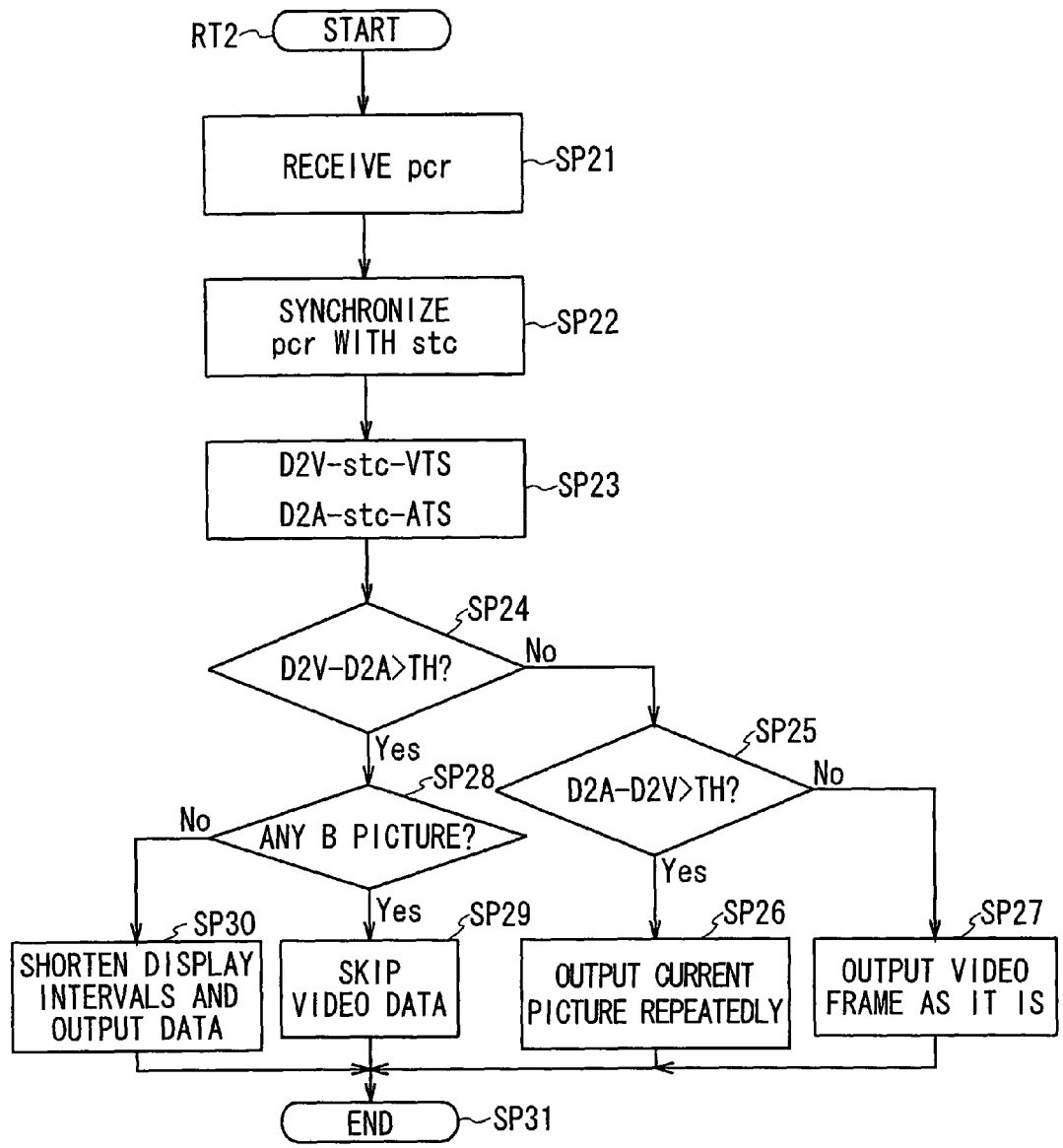
FIG. 14 is a schematic flowchart illustrating the sequence of adjusting the lip-sync during the live streaming.

As described above, the renderer 77 of the real-time streaming decoder 12 adjusts the timing of outputting the video frame VF2 by using the audio frame AF2 as reference, in order to achieve lip-sync of the video and audio during the live-streaming playback. The method of adjusting the output timing will be summarized as follows. As shown in the flowchart of FIG. 14, the renderer 77 of the real-time streaming decoder 12 starts the routine RT2. Then, the renderer 77 goes to Step SP21.

In Step SP21, the renderer 77 of the real-time streaming decoder 12 provided in the second content receiving apparatus 4 receives the clock reference pcr from the PCR circuit 61 of the real-time streaming encoder 11 provided in the first content receiving apparatus 3. Then, the renderer 77 goes to Step SP22.

In Step SP22, the renderer 77 makes the system time clock stc synchronous with the clock reference pcr, by using the PLL circuit 55 constituted by the subtracting circuit 81, filter 82, voltage-controlled crystal oscillator circuit 83 and STC circuit 84. Thereafter, the renderer 77 uses the system time clock stc thus synchronized with the clock reference pcr, as the reference, in adjusting the output timing. The renderer 77 then goes to Step SP23.

In Step SP23, the renderer 77 calculates the difference D2V between the count value that the system time clock stc has at time Tv1, time Tv2, time Tv3, . . . , and the video time-stamp VTS. The renderer 77 also calculates the difference D2A between the count value that the system time clock stc has at time Ta1, time Ta2, time Ta3, . . . , and the audio time-stamp ATS. The renderer 77 goes to Step SP24.

In Step SP24, the renderer 77 obtains a negative decision if D2V-D2A, which has been calculated from the differences D2V and D2A in Step SP23, is smaller than the threshold value TH (e.g., 100[msec]). Then, the renderer 77 goes to Step SP25.

In Step SP25, the renderer 77 obtains a positive decision if D2A-D2V is larger than the threshold value TH (e.g., 100 [msec]). This decision shows that the video is advanced with respect to the audio. In this case, the renderer 77 goes to Step SP26.

In Step SP26, since the video is advanced with respect to the audio, the renderer 77 repeatedly outputs the video frame VF2 constituting the picture being output now so that the audio may catch up with the video. Thereafter, the renderer 77 goes to Step SP31 and terminates the process.

If D2A-D2V does not exceed the threshold value TH in Step SP25, the renderer 77 obtains a negative decision and determines that no noticeable gap has developed between the audio and the video. Then, the renderer 77 goes to Step SP27.

In Step SP27, the renderer 77 outputs the video frame VF2 directly to the monitor 13 in accordance with the video time-stamp VTS, by using the system time clock stc synchronous with the clock reference pcr. This is because no noticeable gap has developed between the audio and the video. The renderer 77 then goes to Step SP31 and terminates the process.

To ensure the continuous outputting of audio data, the renderer 77 outputs the audio frame AF2 directly to the monitor 13 in any case mentioned above in accordance with the audio time-stamp ATS, by using the system time clock stc synchronous with the clock reference pcr.

On the other hand, the renderer 77 may obtain a positive decision in Step SP24. This decision shows that D2V-D2A is larger than the threshold value TH (e.g., 100[msec]) or that the video is delayed with respect to the audio. In this case, the renderer 77 goes to Step SP28.

In Step SP28, the renderer 77 determines whether the output video buffer 79 stores the "B" picture. If the renderer 77 obtains a positive decision, it goes to Step SP29. If it obtains a negative decision, it goes to Step SP30.

In Step SP29, the renderer 77 determines that the video is delayed with respect to the audio. Since it has confirmed that the "B" picture is stored in the output video buffer 79, the renderer 77 does not decode the B picture (video frame Vf3), skipping the same, and outputs the same. Thus, the video can catch up with the audio, accomplishing lip-sync. The renderer 77 then goes to Step SP31 and terminates the process.

In Step SP30, the renderer 77 shortens the picture-refreshing intervals in conformity with the output timing of the monitor 13, utilizing the fact that the output timing of the monitor 13 is 60[Hz] and the picture-refreshing timing is 30[Hz] for the video frame VF2. Thus, the renderer 77 makes the video catch up with the audio, without degrading the image quality due to the skipping of any pictures. Then, the renderer 77 then goes to Step SP31 and terminates the process.

As described above, the renderer 77 of the real-time streaming decoder 12 provided in the second content receiving apparatus 4 synchronizes the system time clock stc of the real-time streaming decoder 12 with the clock reference pcr of the real-time streaming encoder 11 provided in the first content receiving apparatus 3, thereby accomplishing live streaming. Even if the clock reference pcr does not come because it is not transmitted again, for the purpose of ensuring the real-time property of the UDP, the renderer 77 performs lip-sync adjustment on the system time clock stc in accordance with the gap between the audio time-stamp ATS and the video time-stamp VTS. Hence, the renderer 77 can reliably perform lip-sync, while performing the live streaming playback.

(8) Operation and Advantages

In the configuration described above, if the type of the content is composed of audio and video data, the streaming decoder 9 of the first content receiving apparatus 3 presets the value of the system time clock stc again by the preset audio time-stamp ATSp after the value of the system time clock stc has been preset by the preset video time-stamp VTSp. Therefore, the value of the system time clock stc finally coincides with the preset audio time-stamp ATSp (ATSp1, ATSp2, ATSp3, . . . ).

The renderer 37 of the streaming decoder 9 calculates the difference D1 between the count value of the system time clock stc, which has been preset by the preset audio time-stamp ATSp, and the video time-stamp VTS (VTS1, VTS2, VTS3, . . . ) added to the video frames VF1 (Vf1, Vf2, Vf3, . . . ). The renderer 7 can therefore recognize the time difference resulting from the gap between the clock frequency for the encoder side to which the video time-stamp VTS is added, and the clock frequency of the system time clock stc for the decoder side.

In accordance with the difference D1 thus calculated, the renderer 37 of the streaming decoder 9 repeatedly outputs the current picture of the video frame VF1 or outputs the B picture of the non-reference frame, without decoding, and thus skipping, this picture or after shortening the picture-refreshing intervals. The renderer 37 can therefore adjust the output timing of the video data with respect to that of the audio data without interrupting the audio data being output to the monitor 10, while maintaining the continuity of the audio.

If the difference D1 is equal to or smaller than the threshold value TH and so small that the user cannot notice the lip-sync gap, the renderer 37 can output the video data to the monitor 10 just in accordance with video time-stamp VTS (VTS1, VTS2, VTS3, . . . ), without repeatedly outputting the same, skipping and reproducing the same or shortening the picture-refreshing intervals. In this case, too, the continuity of the video can be maintained.

Further, the renderer 77 of the real-time streaming decoder 12 provided in the second content receiving apparatus 4 can synchronize the system time clock stc for the decoder side with the clock reference pcr supplied from the PCR circuit 61 of the real-time streaming encoder 11 provided in the first content receiving apparatus 3, and then output the audio frame AF2 and the video frame VF2 to the monitor 13 in accordance with the audio time-stamp ATS and the video time-stamp VTS. The renderer 77 can therefore achieve the live streaming playback, while maintaining the real-time property.

In addition, the renderer 77 of the real-time streaming decoder 12 provided in the second content receiving apparatus 4 calculates the difference D2V between the system time clock stc and the video time-stamp VTS and the difference D2A between the system time clock stc and the audio time-stamp ATS even if the system time clock stc is not synchronous with the clock reference pcr. This is because the clock reference pcr supplied from the PCR circuit 61 of the real-time streaming encoder 11 provided in the first content receiving apparatus 3 is not sent again by UDP and does not reach the renderer 77. The renderer 77 adjusts the timing of outputting the video frame VF2 in accordance with the gap between the difference D2V and the difference D2A. Hence, the renderer 77 can adjust the output timing of the video data with respect to that of the audio data, without interrupting the audio data being output to the monitor 13, while maintaining the continuity of the audio.

The renderer 37 of the streaming decoder 9 provided in the first content receiving apparatus 3 presets the system time clock stc by using the preset video time-stamp VTSP and the preset audio time-stamp ATSp in accordance with the presetting sequence in which the preset video time-stamp VTSp and the preset audio time-stamp ATSp have been applied in the order mentioned. Thus, the system time clock stc can be preset by using the preset audio time-stamp ATSp if the content is composed of audio data only, and can be preset by using the preset video time-stamp VTSp if the content is composed of video data only. The renderer 37 can therefore cope with the case where the content is composed of audio data and video data, the case where the content is composed of audio data only, and the case the content is composed of video data only.

That is, the content composed of audio data and video data can output the video frame VF1 or the audio frame AF1 not only in the case where the content is not composed of both audio data and video data, but also in the case where the content is composed of video data only and the preset audio time-stamp ATSp is unavailable and in the case where the content is composed of audio data only and no preset video time-stamp VTSp is available. Therefore, the renderer 37 of the streaming decoder 9 can output the content to the monitor 10 at timing that is optimal to the type of the content.

Assume that the difference D1 between the count valued of the system time clock stc preset and the video time-stamp VTS2 is larger than the predetermined threshold value TH and that the video may falls behind the audio. Then, the renderer 37 of the streaming decoder 9 skips the B picture that will not degrade the image quality, not decoding the same, if the B picture is stored in the output video buffer 39. If the B picture is not stored in output video buffer 39, the renderer 37 shortens the picture-refreshing intervals for the video frame VF1 in accordance with the output timing of the monitor 10. This enables the video to catch up with the audio, without degrading the image quality in spite of the picture skipping.

In the configuration described above, the renderer 37 of the streaming decoder 9 provided in the first content receiving apparatus 3 and the renderer 77 of the real-time streaming decoder 12 provided in the second content receiving apparatus 4 can adjust the output timing of the video frames VF1 and VF2, using the output timing of the audio frames AF1 and AF2 as reference. The lip-sync can therefore be achieved, while maintaining the continuity of the audio, without making the user, i.e., the viewer, feel strangeness.

(9) Other Embodiments

In the embodiment described above, the lip-sync is adjusted in accordance with the difference D1 based on the audio frame AF1 or the differences D2V and D2A based on the audio frame AF2, thereby eliminating the gap between the clock frequency for the encoder side and the clock frequency for the decoder side. The present invention is not limited to the embodiment, nevertheless. A minute gap between the clock frequency for the encoder side and the clock frequency for the decoder side, resulting from the clock jitter, the network jitter or the like, may be eliminated.

In the embodiment described above, the content providing apparatus 2 and the first content receiving apparatus 3 are connected by the Internet 5 in order to accomplish pre-encoded streaming. The present invention is not limited to this. Instead, the content providing apparatus 2 may be connected to the second content receiving apparatus 4 by the Internet 5 in order to accomplish pre-encoded streaming. Alternatively, the content may be supplied from the content providing apparatus 2 to the second content receiving apparatus 4 via the first content receiving apparatus 3, thereby achieving the pre-encoded streaming.

In the embodiment described above, the live streaming is performed between the first content receiving apparatus 3 and the second content receiving apparatus 4. The present invention is not limited to this. The live streaming may be performed between the content providing apparatus 2 and the first content receiving apparatus 3 or between the content providing apparatus 2 and the second content receiving apparatus 4.

If this is the case, the clock reference pcr is transmitted from the streaming server 8 of the content providing apparatus 2 to the streaming decoder 9 of the first content receiving apparatus 3. The streaming decoder 9 synchronizes the system time clock stc with the clock reference pcr. The live streaming can be accomplished.

In the embodiment described above, the subtracter circuits 44 and 45 delay the first video time-stamp VTS1 and first audio time-stamp ATS1 by a predetermined time. The present invention is not limited to this. The subtracter circuits 44 and 45 need not delay the first video time-stamp VTS1 and first audio time-stamp ATS1 by the predetermined time, if the value of the system time clock stc preset and supplied to the comparator circuit 46 from the STC circuit 41 has not yet to pass neither the video time-stamp VTS1 nor the audio time-stamp ATS1 at the time they arrive the comparator circuit 46, because they are delayed while being stored in the buffers 42 and 43, respectively.

Moreover, in the embodiment described above, the system time clock stc is preset in accordance with the presetting sequence in which the preset video time-stamp VTSP and the preset audio time-stamp ATSp are applied in the order mentioned, regardless of the type of the content, before the type of the content is determined. The present invention is not limited to this. The type of the content may first be determined, and the system time clock stc may be preset by using the preset video time-stamp VTSP and the preset audio time-stamp ATSp if the content is composed of audio data and video data. If the content is composed of video data only, the system time clock stc may be preset by using the preset video time-stamp VTSp. On the other hand, if the content is composed of audio data only, the system time clock stc may be preset by using the preset audio time-stamp ATSP.

Further, in the embodiment described above, the picture-refreshing rate for the video frames VF1 and VF2 is reduced from 30 [Hz] to 60 [Hz] in compliance with the rate of outputting data to the monitors 10 and 13 if no pictures are stored in the output video buffers 37 and 79. This invention is not limited to this, nevertheless. The picture-refreshing rate for the video frames VF1 and VF2 may be reduced from 30 [Hz] to 60 [Hz], no matter whether there are B pictures. In this case, too, the renderers 37 and 77 can eliminate the delay of the video with respect to the audio, thus achieving the lip-sync.

Still further, in the embodiment described above, the B picture is skipped and output. The present invention is not limited to this. The P picture that immediately precedes the I picture may be skipped and output.

This is because the P picture, which immediately precedes the I picture, will not be referred to when the next picture, i.e., I picture, is generated. Even if skipped, the P picture will make no trouble in the process of generating the I picture or will not result in degradation of the video quality.

Moreover, in the embodiment described above, the video frame Vf3 is skipped, or not decoded, and output to the monitor 10. This invention is not limited to this. At the time the when the video frame Vf3 is decoded and then output from the output video buffer 39, the video frame Vf3 after decoding may be skipped and output.

Further, in the embodiment described above, all audio frames are output to the monitors 10 and 13 because the audio frames AF1 and AF2 are used as reference the process of adjusting the lip-sync. The present invention is not limited to this. For example, if any audio frame corresponds to an anacoustic part, it may be skipped and then output.

Still further, in the embodiment described above, the content receiving apparatuses according to this invention comprise audio decoders 35 and 74, video decoders 36 and 76 used as decoding means, input audio buffers 33 and 73 used as storing means, output audio buffers 38 and 78, input video buffers 34 and 75, output video buffers 39 and 79 and the renderers 37 and 77 used as calculating means and timing-adjusting means. Nonetheless, this invention is not limited to this. The apparatuses may further comprise other various circuits.

Industrial Applicability

This invention can provide a content receiving apparatus, a method of controlling the video-audio output timing and a content providing system, which are fit for use in downloading moving-picture contents with audio data from, for example, servers.

The invention claimed is:

1. A content receiving apparatus comprising:
  a decoding unit for receiving, from a content providing apparatus provided at an encoder side, a plurality of encoded video frames to which video time-stamps based on a reference clock for the encoder side are attached and a plurality of encoded audio frames to which audio time-stamps based on a reference clock for the encoder side are attached, and for decoding the plurality of encoded video frames and the plurality of encoded audio frames;
  a storing unit for storing a plurality of decoded video frames that the decoding unit has obtained by decoding the plurality of encoded video frames and for storing a plurality of decoded audio frames that the decoding unit has obtained by decoding the plurality of encoded audio frames;
  a calculating unit for calculating a time difference resulting from a gap between a clock frequency of a reference clock for the encoder side and a clock frequency of a system time clock for the decoder side; and
  a timing-adjusting unit for adjusting a timing of outputting the plurality of decoded video frames, one by one, in accordance with the time difference and on the basis of a timing of outputting the plurality of decoded audio frames, one by one.

2. The content receiving apparatus according to claim 1, characterized in that the timing-adjusting unit outputs the decoded video frames on the basis of the system time clock for the decoder side when the time difference is shorter than a predetermined time in accordance with the video time-stamps.

3. The content receiving apparatus according to claim 1, comprising:
  a receiving unit for receiving the reference clock for the encoder side transmitted by using UDP (User Datagram Protocol) in real time from the content providing apparatus, and
  wherein the calculating unit first synchronizes the system time clock for the decoder side with the reference clock for the encoder side and then calculates the time difference resulting from the gap between the clock frequency of the reference clock for the encoder side and the clock frequency of the system time clock for the decoder side.

4. The content receiving apparatus according to claim 1, comprising
  a presetting unit which presets the system time clock at the decoder side, by using the video time-stamp or the audio time-stamp, in accordance with a presetting sequence in which the video time-stamp and the audio time-stamp are applied in the order mentioned, and
  wherein the calculating unit calculates the time difference resulting from the gap between the clock frequency of the reference clock for the encoder side and the clock frequency of the system time clock for the decoder side which has been preset.

5. The content receiving apparatus according to claim 1, comprising:
  a presetting unit for presetting the system time clock for the decoder side by using the audio time-stamp, in accordance with a presetting sequence in which the video time-stamp and the audio time-stamp are applied in the order mentioned, when a content received is audio data; and
  an audio-data outputting unit for outputting audio data of the audio frame on the basis of the system time clock, which has been preset, and the audio time-stamp.

6. The content receiving apparatus according to claim 1, comprising:
  a presetting unit for presetting the system time clock for the decoder side by using the video time-stamp, in accordance with a presetting sequence in which the video time-stamp and the audio time-stamp are applied in the order mentioned, when a content received is video data; and a video-data outputting unit for outputting video data of the video frame on the basis of the system time clock, which has been preset, and the video time-stamp.

7. A method of controlling a video-audio output timing, comprising:

a decoding step of first receiving, from a content providing apparatus provided at an encoder side, a plurality of encoded video frames to which video time-stamps based on a reference clock for the encoder side are attached and a plurality of encoded audio frames to which audio time-stamps based on a reference clock for the encoder side are attached, and then decoding the plurality of encoded video frames and the plurality of encoded audio frames in a decoding unit;

a storing step of storing, in a storing unit, a plurality of decoded video frames obtained by decoding the plurality of encoded video frames in the decoding unit and a plurality of decoded audio frames obtained by decoding the plurality of encoded audio frames in the decoding unit;

a difference calculating step of calculating, in a calculating unit, a time difference resulting from a gap between a clock frequency of a reference clock for the encoder side and a clock frequency of a system time clock for the decoder side; and a timing-adjusting step of adjusting, in an adjusting unit, a timing of outputting the plurality of decoded video frames, one by one, in accordance with the time difference and on the basis of a timing of outputting the plurality of decoded audio frames, one by one.

8. A content providing system comprising: a content providing apparatus configured to:

generate a plurality of encoded video frames to which video time-stamps based on a reference clock for an encoder side are attached and a plurality of encoded audio frames to which audio time-stamps based on the reference clock are attached, and sequentially transmit the plurality of encoded video frames and the plurality of encoded audio frames; and a content receiving apparatus configured to:

receiving receive the plurality of encoded video frames and the plurality of encoded audio frames to from the content providing apparatus for an encoder side, decode the plurality of encoded video frames and the plurality of encoded audio frames, store the plurality of decoded video frames and the plurality of decoded audio frames, calculate a time difference resulting from a gap between a clock frequency of the reference clock for the encoder side and a clock frequency of a system time clock for the decoder side, and adjust a timing of outputting the plurality of decoded video frames, one by one, in accordance with the time difference and on the basis of a timing of outputting the plurality of decoded audio frames, one by one.

* * * * *